(12) United States Patent
Guy et al.

(10) Patent No.: US 10,721,880 B2
(45) Date of Patent: Jul. 28, 2020

(54) METHOD AND SYSTEM FOR CROP MANAGEMENT

(71) Applicant: Phytech Ltd., Kibbutz Yad Mordechai (IL)

(72) Inventors: Omer Guy, Kibbutz Kfar Rupin (IL); Eitan Peleg, Mitzpe Ilan (IL); Yochay Altman, Kibbutz Kramim (IL); Sarig Duek, Kibbutz Kfar Etzion (IL)

(73) Assignee: Phytech Ltd., Kibbutz Yad Mordechai (IL)

( * ) Notice: Subject to any disclaimer, the term of this patent is extended or adjusted under 35 U.S.C. 154(b) by 132 days.

(21) Appl. No.: 15/105,039

(22) PCT Filed: Dec. 18, 2014

(86) PCT No.: PCT/IL2014/051112
§ 371 (c)(1),
(2) Date: Jun. 16, 2016

(87) PCT Pub. No.: WO2015/092799
PCT Pub. Date: Jun. 25, 2015

(65) Prior Publication Data
US 2016/0316643 A1 Nov. 3, 2016

Related U.S. Application Data

(60) Provisional application No. 61/917,988, filed on Dec. 19, 2013, provisional application No. 61/918,007, filed on Dec. 19, 2013.

(51) Int. Cl.
*A01G 25/16* (2006.01)
*A01G 22/00* (2018.01)
(Continued)

(52) U.S. Cl.
CPC ............... *A01G 25/16* (2013.01); *A01G 7/00* (2013.01); *A01G 22/00* (2018.02); *A01G 25/167* (2013.01);
(Continued)

(58) Field of Classification Search
CPC ....................... C12N 15/8262; C12N 15/8273; A01G 1/001; A01G 25/16; A01G 9/26; G05B 2219/2625
(Continued)

(56) References Cited

U.S. PATENT DOCUMENTS

| 6,178,253 B1 | 1/2001 | Hendrickson et al. |
| 6,466,321 B1 | 10/2002 | Satake et al. |

(Continued)

FOREIGN PATENT DOCUMENTS

| AU | 200118261 | 6/2002 |
| CN | 1286898 | 3/2001 |

(Continued)

OTHER PUBLICATIONS

Examination Report dated Aug. 1, 2017 From the Australian Government, IP Australia Re. Application No. 2014369083.
(Continued)

*Primary Examiner* — Michael J Brown

(57) ABSTRACT

A method of managing treatment of crop is disclosed. The method comprises: monitoring a first parameter describing a daily shrinkage of a plant part of the crop, and a second parameter describing daily growth rate of a plant part of the crop. The method further comprises calculating a plant status function based on a value of the first parameter and a value of the second parameter, and operating a crop treatment system responsively to the plant status function.

25 Claims, 12 Drawing Sheets
(9 of 12 Drawing Sheet(s) Filed in Color)

(51) Int. Cl.
*A01G 7/00* (2006.01)
*G06Q 10/06* (2012.01)
*A01H 5/08* (2018.01)
*A01G 9/26* (2006.01)
*A01B 79/00* (2006.01)

(52) U.S. Cl.
CPC ........ *G06Q 10/0637* (2013.01); *A01B 79/005* (2013.01); *G05B 2219/2625* (2013.01); *Y02A 90/26* (2018.01)

(58) Field of Classification Search
USPC .......................................................... 700/284
See application file for complete search history.

(56) References Cited

U.S. PATENT DOCUMENTS

| | | | |
|---|---|---|---|
| 6,714,925 | B1 | 3/2004 | Barnhill et al. |
| 6,882,990 | B1 | 4/2005 | Barnhill et al. |
| 2002/0170229 | A1* | 11/2002 | Ton .......................... A01G 2/00 47/1.7 |
| 2010/0268391 | A1 | 10/2010 | Anderson |
| 2011/0162116 | A1 | 6/2011 | Holman |
| 2011/0301755 | A1 | 12/2011 | Anderson |
| 2012/0010938 | A1 | 1/2012 | Standley et al. |
| 2012/0109387 | A1* | 5/2012 | Martin .................. A01G 25/167 700/284 |
| 2014/0035752 | A1 | 2/2014 | Johnson et al. |
| 2014/0288850 | A1* | 9/2014 | Avigdor ................. G05B 11/32 702/19 |
| 2016/0309659 | A1 | 10/2016 | Guy et al. |

FOREIGN PATENT DOCUMENTS

| | | |
|---|---|---|
| CN | 101044823 | 10/2007 |
| CN | 101869047 | 10/2010 |
| CN | 102954816 | 3/2013 |
| CN | 103327807 | 9/2013 |
| EP | 1806049 | 7/2007 |
| JP | 2000-055702 | 2/2000 |
| WO | WO 2015/092799 | 6/2015 |
| WO | WO 2015/092800 | 6/2015 |

OTHER PUBLICATIONS

International Preliminary Report on Patentability dated Jun. 30, 2016 From the International Bureau of WIPO Re. Application No. PCT/IL2014/051112.
International Preliminary Report on Patentability dated Jun. 30, 2016 From the International Bureau of WIPO Re. Application No. PCT/IL2014/051113.
International Search Report and the Written Opinion dated Mar. 12, 2015 From the International Searching Authority Re. Application No. PCT/IL2014/051113.
International Search Report and the Written Opinion dated Apr. 16, 2015 From the International Searching Authority Re. Application No. PCT/IL2014/051112.
Fernandez et al. "Use of Maximum Trunk Diameter Measurements to Detect Water Stress in Mature 'Arbequina' Olive Trees under Deficit Irrigation", Agricultural Water Management, 98(12): 1813-1821, 2011.
Goldhamer et al. "Irrigation Scheduling of Almond Trees With Trunk Diameter Sensors", Irrigation Science, 23(1): 11-19, Apr. 2004.
Ortuno et al. "Could Trunk Diameter Sensors Be Used in Woody Crops for Irrigation Scheduling? A Review of Current Knowledge and Future Perspectives", Agricultural Water Management, 97(1): 1-11, Oct. 1, 2010. p. 3, Lines 1-10, 36-44, p. 5, Left Col., Lines 13-15, p. 7, Right Col., Lines 22-26, p. 9, Left Col., Lines 22-27, Fig.3.

Shackel et al. "Water Stress Responses of Almond [*Prunus dulcis* (Mill.) Webb.] Trees Under Field Conditions", II International Symposium on Pistachios and Almonds, ISHS Acta Horticulturae 1997, 470: 309-316, 1998.
Notification of Office Action and Search Report dated Sep. 18, 2018 From the State Intellectual Property Office of the People's Republic of China Re. Application No. 201480075982.9 and Its Translation of Office Action Into English. (20 Pages).
Kang et al. "Study on Drought Evaluation Model of Winter Wheat Based on Crop Water Production Function", Chinese Agriculture Science Bulletin, 27(8): 274-279, Jan. 23, 2011. English Abstract.
Mi et al. "Artificial Neural Network and Its Application in Agricultural and Ecological Research", Acta Phytoecologica Sinica, 29(5): 863-870, Jan. 23, 2005. English Abstract.
Examination Report dated Apr. 4, 2018 From the Australian Government, IP Australia Re. Application No. 2014369083. (4 Pages).
Patent Examination Report dated Jan. 25, 2018 From the Australian Government, IP Australia Re. Application No. 2014369084. (4 Pages).
Official Action dated Aug. 9, 2018 From the U.S. Patent and Trademark Office Re. U.S. Appl. No. 15/105,115. (25 pages).
Notification of Office Action and Search Report dated Oct. 9, 2018 From the State Intellectual Property Office of the People's Republic of China Re. Application No. 201480075973.X. (15 Pages).
Notice of Acceptance dated Nov. 22, 2018 From the Australian Government, IP Australia Re. Application No. 2014369084. (3 Pages).
Official Action dated May 2, 2019 From the U.S. Patent and Trademark Office Re. U.S. Appl. No. 15/105,115. (29 pages).
Translation Dated Dec. 10, 2018 of Notification of Office Action dated Oct. 9, 2018 From the State Intellectual Property Office of the People's Republic of China Re. Application No. 201480075973.X. (14 Pages).
Examination Report dated Aug. 8, 2019 From the Servico Publico Federal Minitsterio Da Economia Insttuto Nacional Da Propriedace Industrial of Brazil RE Application No. BR1120160142926. (4 Pages).
Examination Report dated Aug. 8, 2019 From the Servico Publico Federal Minitsterio Da Economia Insttuto Nacional Da Propriedace Industrial of Brazil Re Application No. BR12016014285.3. (4 Pages).
Notification of Office Action dated Aug. 23, 2019 From the State Intellectual Property Office of the People's Republic of China Re. Application No. 201480075982.9. (8 Pages).
Notification of Office Action dated Jun. 4, 2019 From the State Intellectual Property Office of the People's Republic of China Re. Application No. 201480075973.X. (12 Pages).
Examination Report Under Sections 12 & 13 of the Patents Act, 1970 and the Patents Rules, 2003 dated Dec. 20, 2019 From the Government of India, Intellectual Property India, Patents, Designs, Trade Marks, Geographical Indications, The Patent Office Re. Application No. 201627024521. (6 Pages).
Examination Report Under Sections 12 & 13 of the Patents Act, 1970 and the Patents Rules, 2003 dated Nov. 25, 2019 From the Government of India, Intellectual Property India, Patents, Designs, Trade Marks, Geographical Indications, The Patent Office Re. Application No. 201627024520. (6 Pages).
Notification of Office Action and Search Report dated Jan. 6, 2020 From the State Intellectual Property Office of the People's Republic of China Re. Application No. 201480075973.X and Its Summary in English. (15 Pages).
Huang et al. "Chap.7: Plants and the Environment. Chap.27: Plant Defense Against Insects. Chap.28: Mathematical Models in Plant Physiology", Plant Physiology and Molecular Biology, 3rd Ed., p. 640-667, Jun. 2007.
Unknown "Symposium Anthology on China's Digital Agriculture and Rural Informatization Development Strategy", Department of Rural and Social Development, Ministry of Science and Technology, p. 144, Dec. 2003.
Translation Dated Sep. 5, 2019 of Notification of Office Action dated Aug. 23, 2019 From the State Intellectual Property Office of

(56) References Cited

OTHER PUBLICATIONS the People's Republic of China Re. Application No. 201480075982. 9. (11 Pages).

* cited by examiner

METHOD AND SYSTEM FOR CROP MANAGEMENT

RELATED APPLICATIONS

This application is a National Phase of PCT Patent. Application No. PCT/IL2014/051112 having international filing date of Dec. 18, 2014, which claims the benefit of priority under 35 USC 119(e) of U.S. Provisional Patent Application Nos. 61/917,988 and 61/918,007, both filed on Dec. 19, 2013. The contents of which the above applications are all incorporated herein by reference in their entirety.

FIELD AND BACKGROUND OF THE INVENTION

The present invention, in some embodiments thereof, relates to agriculture and, more particularly, but not exclusively, to a method and system for crop management.

Most of the consumed fresh water in the world is for irrigation, and most of the irrigation is for agriculture. Currently employed irrigation techniques include gravity fed or "flooding" techniques, center pivot irrigation, sprinklers and drip irrigation.

Even though drip irrigation provides water efficiency which is much higher than either gravity fed or center pivot techniques, there remains a tendency to overwater.

The measurement of climatic parameters which are used for evapotranspiration calculation, soil moisture and soil water potential have suggested for scheduling irrigation. Use of plants as indicators for irrigation scheduling has been suggested. However, prior attempts were hampered by the dynamic nature of plant water status and by the lack of suitable indicators, relative to established scheduling methods based on atmospheric and soil observations. Goldhamer and Fereres suggested that the maximum daily shrinkage (MDS) of tree trunks of almond trees can be used as a single parameter for irrigation scheduling [Goldhamer and Fereres, Irrig Sci (2004) 23: 11-19]. Fernandez et al., suggested that the measurements of the daily difference for maximum trunk diameter have the potential for scheduling low frequency deficit irrigation strategies in mature Arbequina olive trees with heavy fruit load [Fernandez et al., Agricultural Water Management 98 (2011) 1813-1821].

SUMMARY OF THE INVENTION

According to an aspect of some embodiments of the present invention there is provided a method of managing treatment of crop. The method comprises: monitoring a first parameter describing a daily shrinkage of a plant part of the crop, and a second parameter describing daily growth rate of a plant part of the crop. The method further comprises calculating a plant status function based on a value of the first parameter and a value of the second parameter, and operating a crop treatment system responsively to the plant status function.

According to some embodiments of the invention, the calculation of the plant status function comprises normalizing the first and the second parameters wherein the plant status function is a function of the normalized parameters.

According to some embodiments of the invention the method comprises calculating a plant stress score based on the plant status function and on history values of the plant status function.

According to some embodiments of the invention the operation of the crop treatment system is also responsively to the plant stress score.

According to some embodiments of the invention the invention the method comprises comparing the calculated plant status function to a plant status baseline, wherein the operating the crop treatment system is responsively to the comparison.

According to some embodiments of the invention the method comprises varying at least one operational parameter of the crop treatment system when the calculated plant status function is below the plant status baseline.

According to some embodiments of the invention the method comprises varying at least one operational parameter of the crop treatment system when a difference between the calculated plant status function and the plant status baseline, in absolute value, is above a predetermined threshold.

According to some embodiments of the invention the method comprises receiving history data pertaining to a status of the crop, and updating the plant status function based in part on the history data. According to some embodiments of the invention the method comprises receiving soil moisture data from a soil in which the crop is planted, and calibrating soil moisture data based on the plant status function.

According to some embodiments of the invention the method comprises receiving irrigation amount data, and calibrating the irrigation amount data based on the plant status function. According to some embodiments of the invention the calibration comprises calculating soil moisture threshold, and the method comprises monitoring the soil moisture data and repeatedly comparing the monitored soil moisture data to the soil moisture threshold, wherein the operating the crop treatment system is responsively to the comparison.

According to some embodiments of the invention the method comprises comprising receiving climate data from a field in which the crop is planted, and calibrating the climate data based on the plant status function.

According to some embodiments of the invention the method comprises predicting an estimate of at least one of a height of the plant, a fruit size of the plant, a fruit maturity time of the plant, and a yield of the plant based on the plant status function.

According to some embodiments of the invention the method comprises predicting an estimate of at least one of a height of the plant, a fruit size of the plant, a fruit maturity time of the plant, and a yield of the plant based on the plant stress score.

According to some embodiments of the invention the method comprises predicting an estimate of a water potential of the plant part based on the plant stress score.

According to some embodiments of the invention the method comprises predicting an estimate of a water potential of the plant part based on the plant status function.

According to some embodiments of the invention the crop treatment system comprises an irrigation system.

According to some embodiments of the invention the monitoring of the first and second parameters comprises receiving dendrometer data from the plant part and calculating the parameters based on the dendrometer data.

According to some embodiments of the invention the method comprises receiving from a geographic information system geographic data pertaining to a field containing the crop, and providing, based on the geographic data and the plant status function of the plant part, an estimated plant status value corresponding to a plant part for which the daily shrinkage and the daily growth rates are unknown.

According to some embodiments of the invention the geographic data comprises at least one parameter selected from the group consisting of canopy area distribution, temperature distribution, and NDVI distribution.

According to some embodiments of the invention the providing the estimated plant status value comprises extrapolation and/or interpolation according to the geographic data.

According to some embodiments of the invention the method comprises receiving from a geographic information system geographic data pertaining to a field containing the crop, selecting, based on the geographic data, a plurality of plant parts at different locations over the field, and repeating the monitoring, and the calculation of the plant status function for each selected plant parts.

According to some embodiments of the invention the method comprises providing, based on the geographic data and the calculated plant status function, an estimated plant status value corresponding to a plant part for which the daily shrinkage and the daily growth rates are unknown.

According to some embodiments of the invention the geographic data comprises at least one geographic parameter selected from the group consisting of canopy area distribution, temperature distribution, and NDVI distribution.

According to some embodiments of the invention the selecting the plurality of plant parts, comprises selecting at least two plant parts characterized by different geographic parameter.

According to an aspect of some embodiments of the present invention there is provided a method of characterizing a status of a plant. The method comprises: receiving a first parameter describing a daily shrinkage of a part of the plant, and a second parameter describing daily growth rate of a part of the plant. The method comprises operating a data processor for calculating a plant status function based on a value of the first parameter and a value of the second parameter, and for transmitting the plant status function to a computer readable medium or a display device.

According to an aspect of some embodiments of the present invention there is provided a computer software product. The computer software product comprises a non-volatile computer-readable medium in which program instructions are stored, which instructions, when read by a data processor, cause the data processor to receive a first parameter describing a daily shrinkage of a part of the plant, and a second parameter describing daily growth rate of a part of the plant, and to calculate a plant status function based on a value of the first parameter and the second parameter.

According to an aspect of some embodiments of the present invention there is provided a system for managing treatment of crop. The system comprises a sensor system deployed and configured for measuring and transmitting data pertaining to a first parameter describing a daily shrinkage of a plant part of the crop, and a second parameter describing daily growth rate of a plant part of the crop. The system comprises a data processor configured for receiving the data from the sensor system, extracting the parameters from the data, and calculating a plant status function based on a value of the parameters.

According to some embodiments of the invention the system comprises a controller configured for operating a crop treatment system responsively to the plant status function.

According to some embodiments of the invention the plant status function is a linear function of the first and the second parameters.

According to some embodiments of the invention the system wherein for at least one of the parameters, a coefficient of the parameter within the linear function is proportional to a variation of the parameter.

According to some embodiments of the invention the system wherein for at least one of the parameters, a coefficient of the parameter within the linear function is a ratio between a variation of the parameter and a sum of variations of the first and the second parameter.

According to some embodiments of the invention the variation is calculated with respect to a value of the at least one parameter on a preceding day.

According to some embodiments of the invention the data processor is configured for normalizing the first and the second parameters wherein the plant status function is a function of the normalized parameters.

According to some embodiments of the invention the data processor is configured for calculating a plant stress score based on the plant status function and on history values of the plant status function.

According to some embodiments of the invention the system comprises a controller configured for operating a crop treatment system responsively to the plant stress score.

According to some embodiments of the invention the data processor is configured for accessing a database storing a baseline plant status, comparing the calculated plant status function to the baseline plant status, and issue a report regarding the comparison.

According to some embodiments of the invention the data processor is configured for receiving history data pertaining to a status of the crop, and updating the plant status function based in part on the history data.

According to some embodiments of the invention the data processor is configured for receiving soil moisture data from a soil in which the crop is planted, and calibrating soil moisture data based on the plant status function.

According to some embodiments of the invention the data processor is configured for receiving irrigation amount data, and calibrating the irrigation amount data based on the plant status function. According to some embodiments of the invention the calibration comprises calculating soil moisture threshold, and the data processor is configured for monitoring the soil moisture data and repeatedly comparing the monitored soil moisture data to the soil moisture threshold.

According to some embodiments of the invention the data processor is configured for receiving climate data from a field in which the crop is planted, and calibrating the climate data based on the plant status function.

According to some embodiments of the invention the data processor is configured for predicting an estimate of at least one of a height of the plant, a fruit size of the plant, a fruit maturity time of the plant, and a yield of the plant based on the plant status function.

According to some embodiments of the invention the data processor is configured for predicting an estimate of a water potential of the plant part based on the plant status function.

According to some embodiments of the invention the data processor is configured for predicting an estimate of at least one of a height of the plant, a fruit size of the plant, a fruit maturity time of the plant, and a yield of the plant based on the plant stress score.

According to some embodiments of the invention the data processor is configured for predicting an estimate of a water potential of the plant part based on the plant stress score.

According to some embodiments of the invention the sensor system comprises a sensing element attached to the plant part. According to some embodiments of the invention the sensor system comprises at least one dendrometer.

According to some embodiments of the invention the sensor system comprises at least one device selected from the group consisting of a pressure chamber, a psychrometer and a temperature sensor.

According to some embodiments of the invention the system comprises the crop treatment system. According to some embodiments of the invention the crop treatment system comprises an irrigation system.

According to some embodiments of the invention the plant part is a trunk. According to some embodiments of the invention the plant part is a stem. According to some embodiments of the invention the plant part is a fruit.

According to some embodiments of the invention the plant status function is specific to a genus of the crop. According to some embodiments of the invention the plant status function is specific to a species of the crop. According to some embodiments of the invention the plant status function is specific to an age of the crop. According to some embodiments of the invention the plant status function is specific to a stage in a growth cycle of the crop.

According to some embodiments of the invention the data processor is configured for receiving geographic data pertaining to a field containing the crop, and for providing, based on the geographic data and the plant status function of the plant part, an estimated plant status value corresponding to a plant part for which the daily shrinkage and the daily growth rates are unknown.

According to some embodiments of the invention the geographic data comprises at least one parameter selected from the group consisting of canopy area distribution, temperature distribution, and NDVI distribution.

According to some embodiments of the invention the providing the estimated plant status value comprises extrapolation and/or interpolation according to the geographic data.

According to some embodiments of the invention the data processor is configured for receiving geographic data pertaining to a field containing the crop, and for selecting, based on the geographic data, a plurality of plant parts at different locations over the field, and wherein the sensor system is deployed over the selected plant parts.

According to some embodiments of the invention the data processor is configured for providing, based on the geographic data and the plant status function of the plant part, an estimated plant status value corresponding to a plant part for which the daily shrinkage and the daily growth rates are unknown.

According to some embodiments of the invention the geographic data comprises at least one geographic parameter selected from the group consisting of canopy area distribution, temperature distribution, and NDVI distribution.

According to some embodiments of the invention the data processor is configured for selecting at least two plant parts having different values of at least one geographic parameter.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1 is a flowchart diagram illustrating a method suitable for characterizing a status of a plant, according to some embodiments of the present invention;

FIG. 2 is a flowchart diagram illustrating a method suitable for managing treatment of crop, according to some embodiments of the present invention;

FIG. 3 is a schematic illustration, showing a block diagram of a system for managing treatment of crop, according to some embodiments of the present invention;

FIG. 4 shows trunk diameter variations in millimeters of two trees under similar conditions, as measured during an experiment performed according to some embodiments of the present invention;

FIG. 5 shows maximum daily shrinkage values of the same two trees as in FIG. 4, as measured during an experiment performed according to some embodiments of the present invention;

FIG. 6 shows plant status functions S1 and S2, as calculated for each of the trees of FIG. 4 during an experiment performed according to some embodiments of the present invention;

FIG. 7 shows correlation between the plant status function of the present embodiments and measured stem water potential, as obtained during an experiment performed according to some embodiments of the present invention;

FIG. 8 shows cotton height as measured (diamonds) and as calculated using the plant status function of the present embodiments (solid line), as obtained during an experiment performed according to some embodiments of the present invention;

FIG. 9 shows stem water potential as measured (diamonds) and as calculated using the plant status function of the present embodiments (solid line), as obtained during an experiment performed according to some embodiments of the present invention;

FIG. 10 shows measured soil moisture in percentage (left ordinate) and the plant status function of the present embodiments (right ordinate), as obtained during an experiment performed according to some embodiments of the present invention;

FIG. 11 shows SWP prediction based on plant status, measured SWP values (triangles) and a reference baseline, as obtained during an experiment performed according to some embodiments of the present invention;

Figure 12:
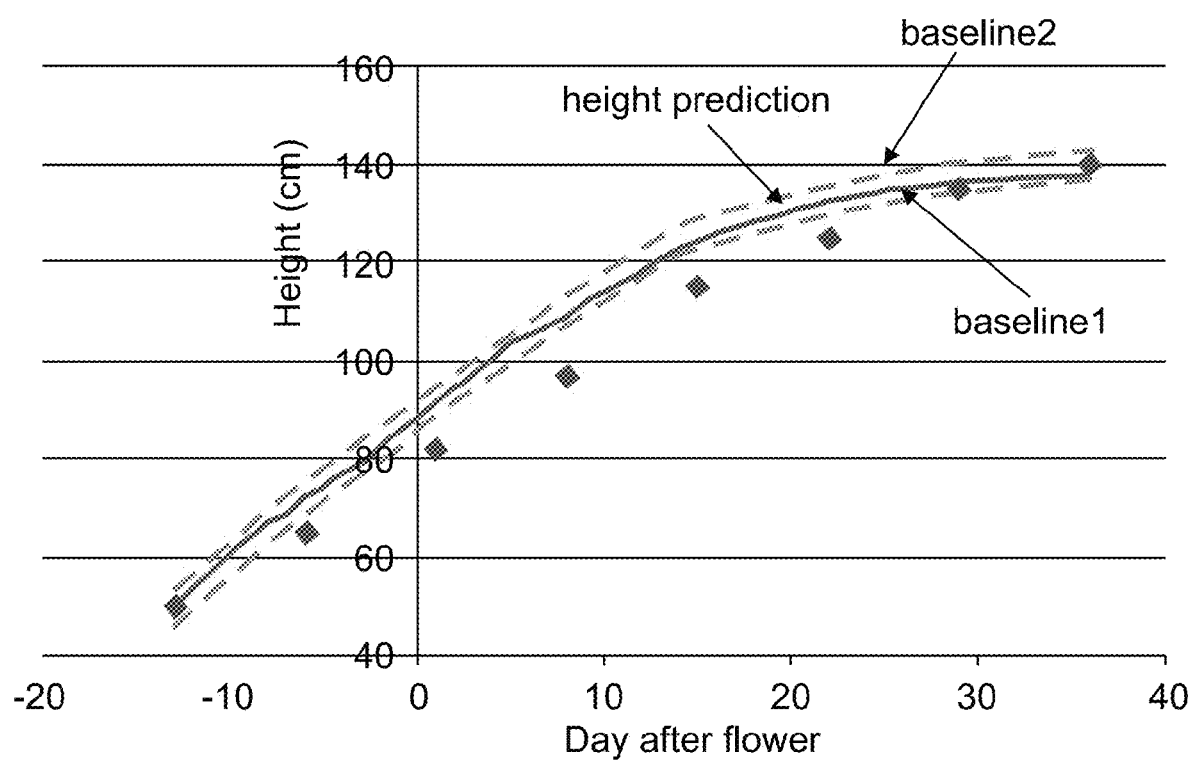
Figure 13:
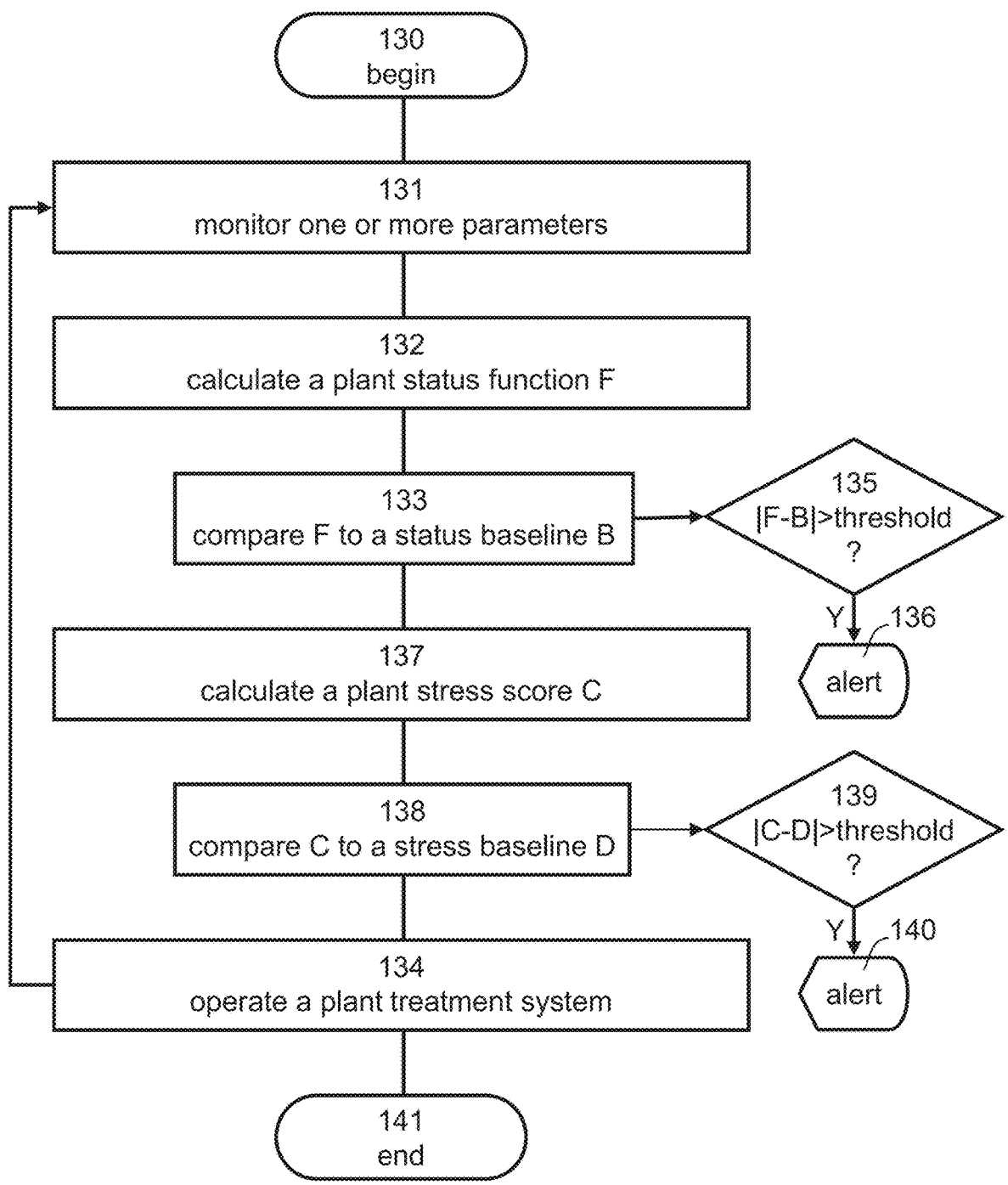
Figure 14:
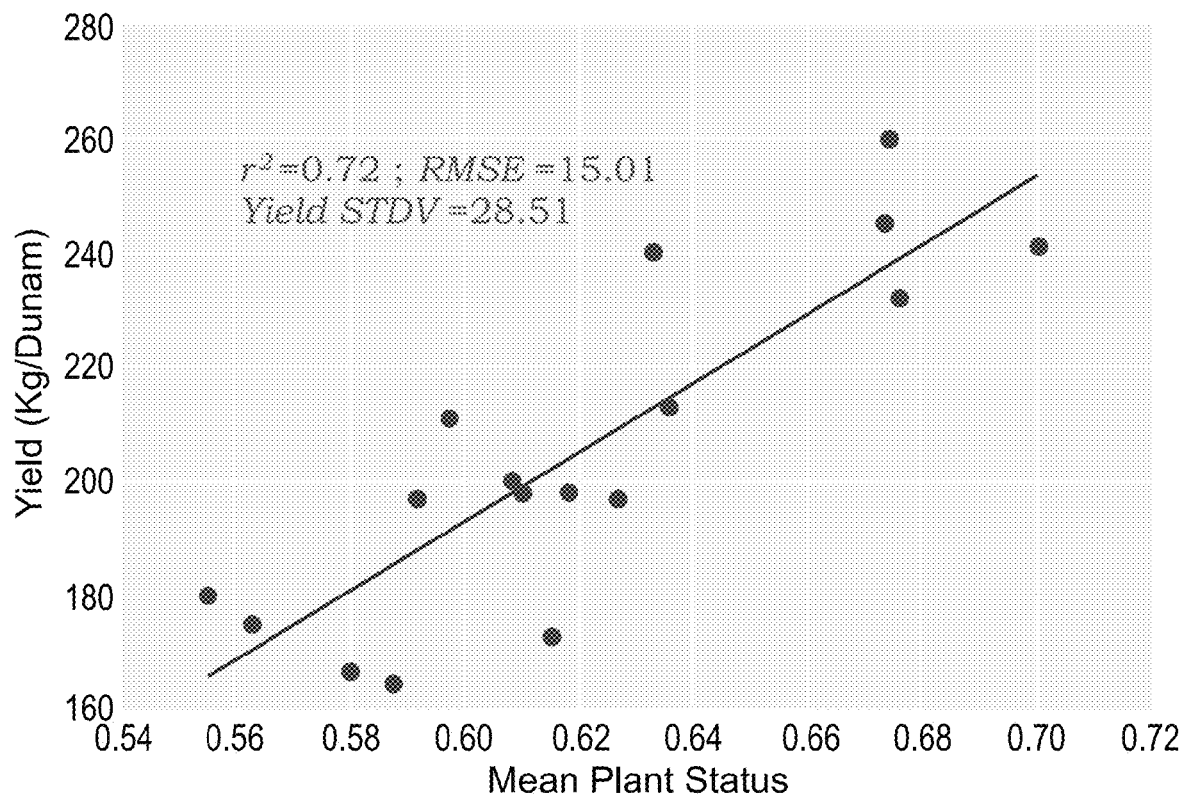
Figure 15:
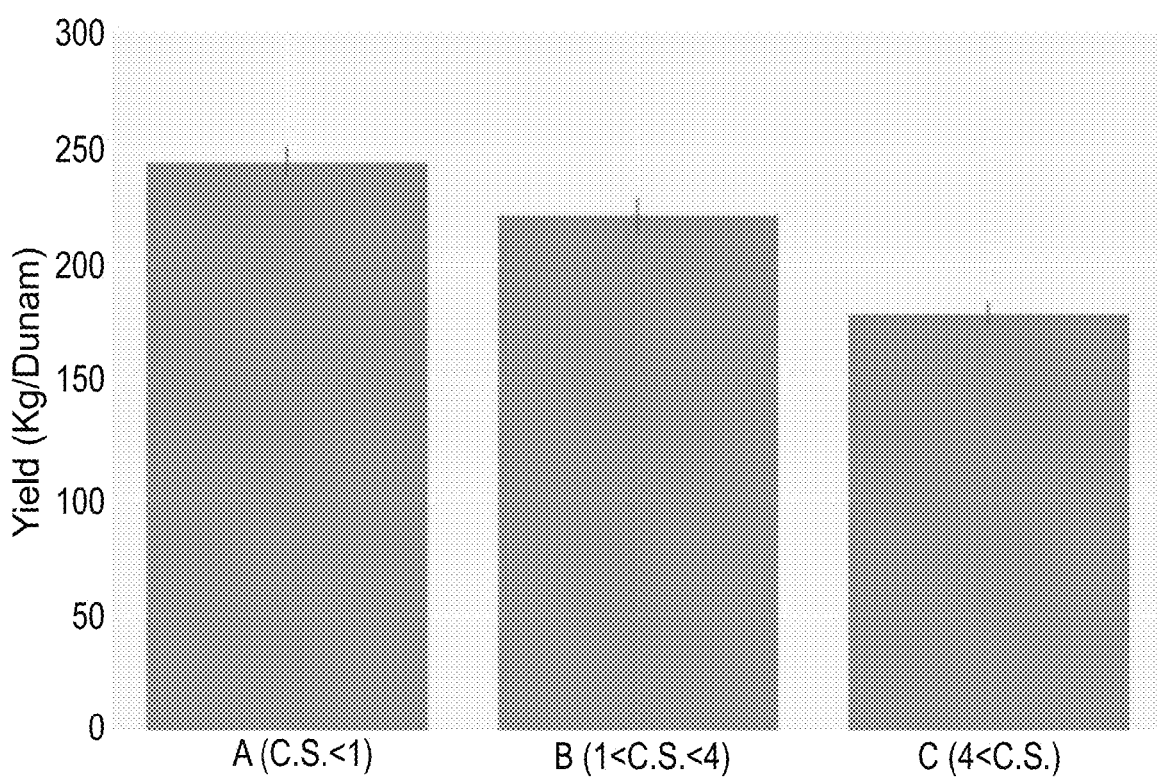
Figure 16:
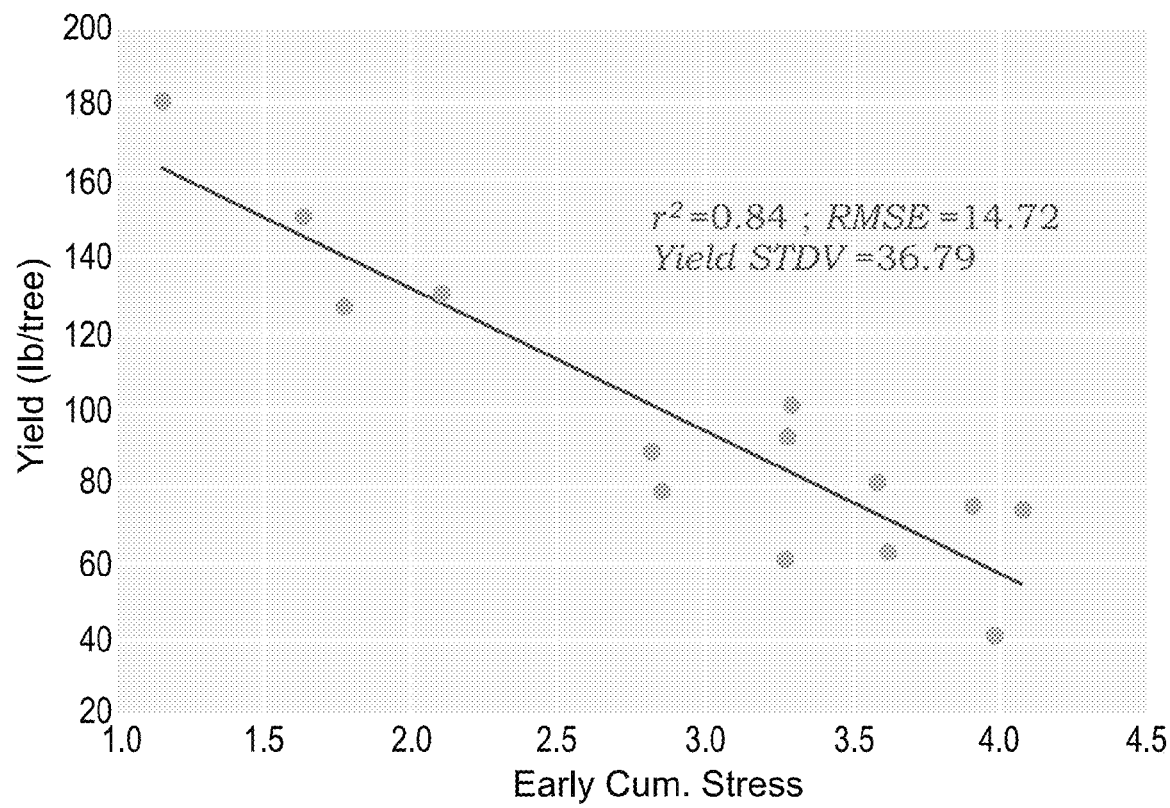
Figure 17:
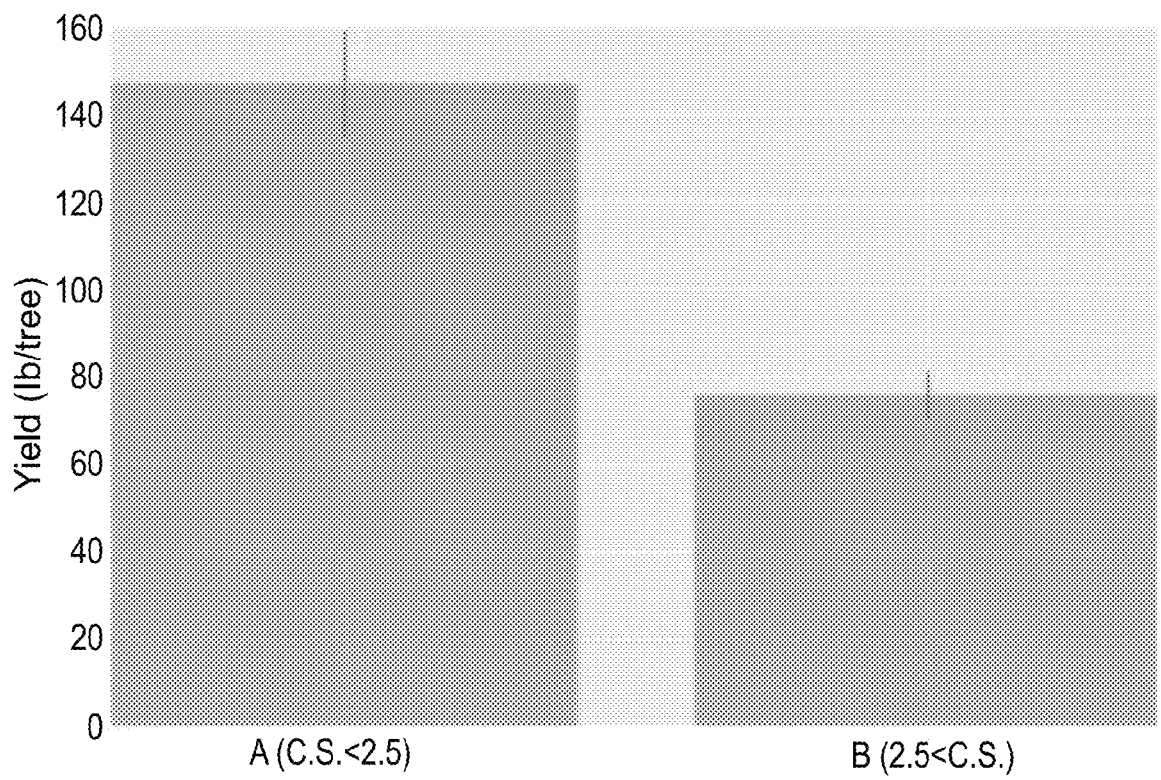
Figure 18A:
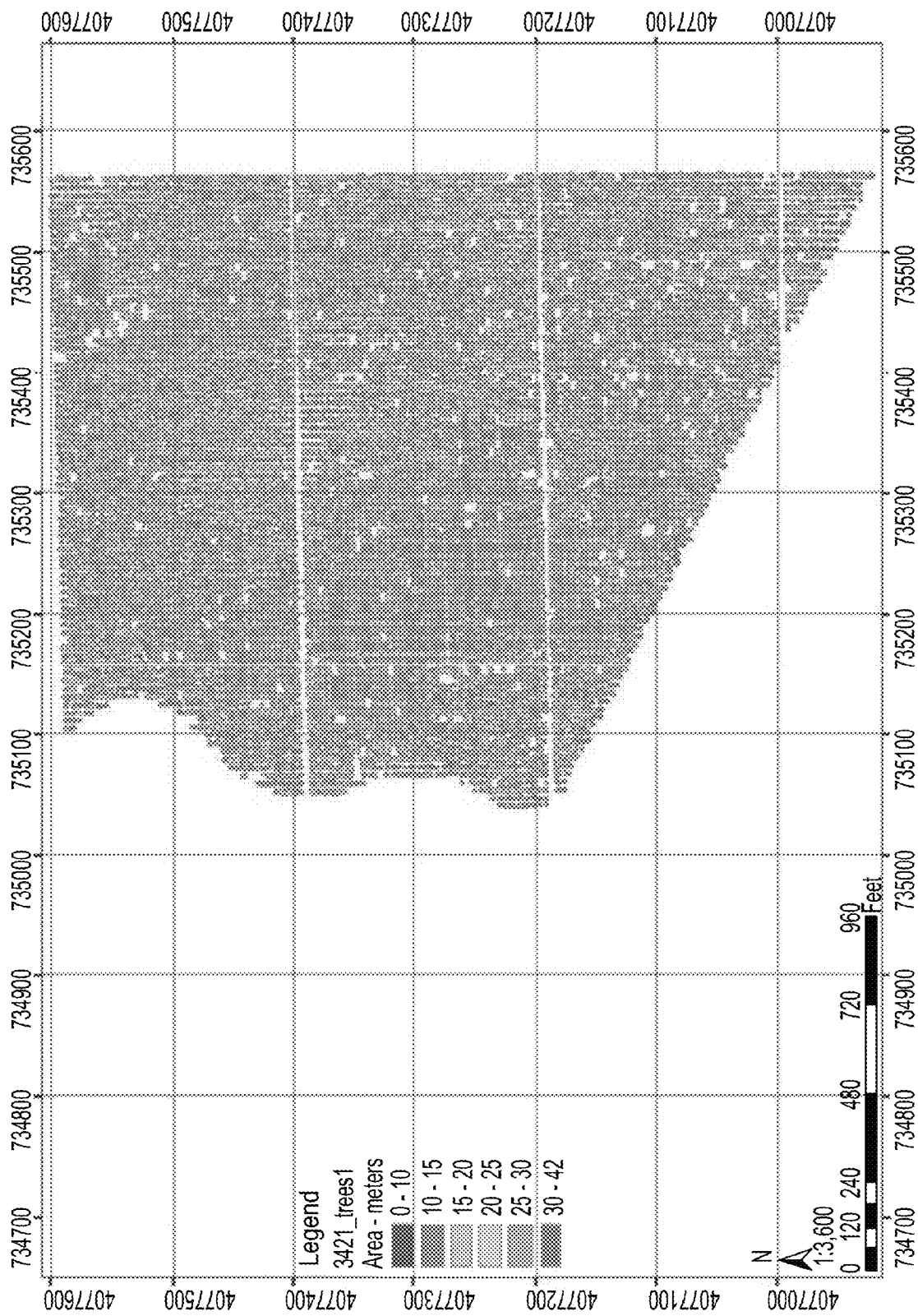
Figure 18B:
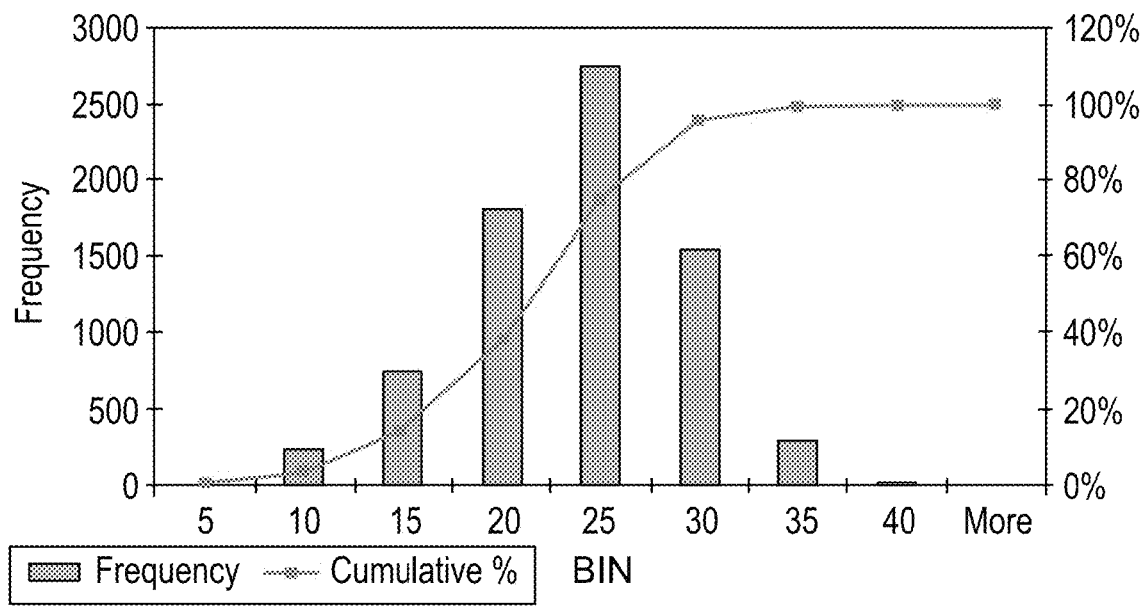
Figure 19:
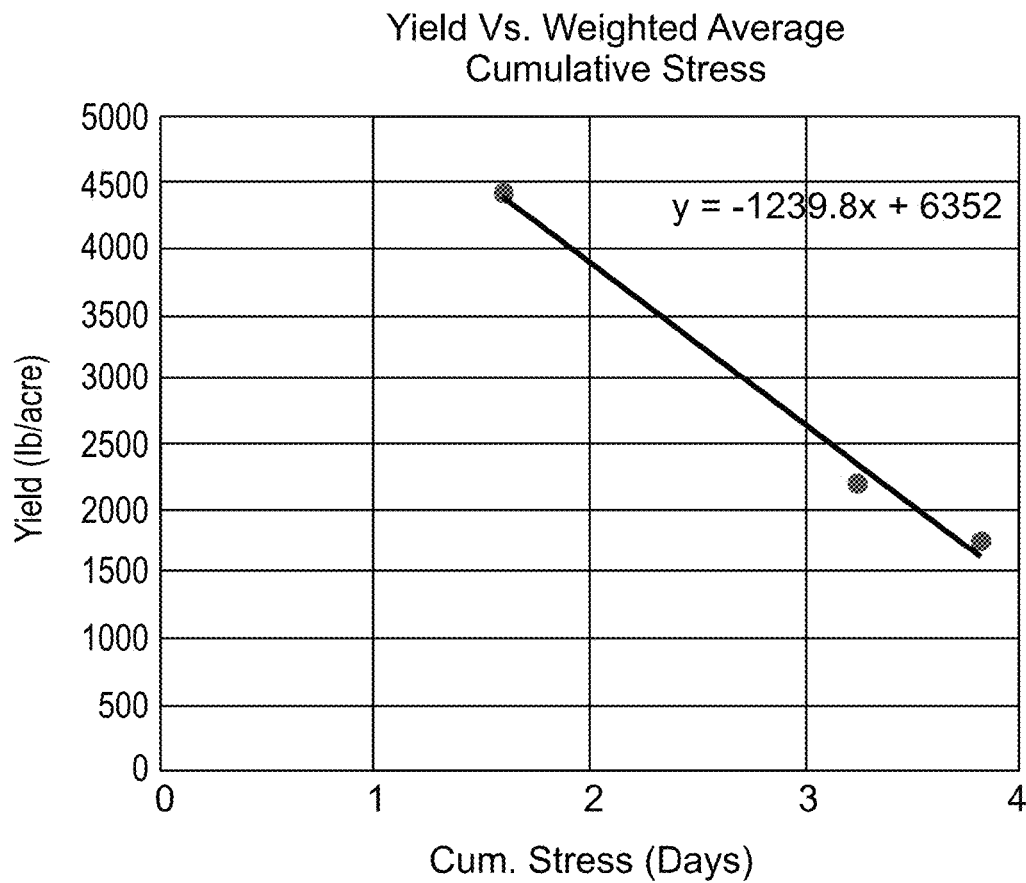

FIG. 12 shows cotton height prediction based on plant status, cotton height measurements (diamonds), and two reference baselines, as obtained during an experiment performed according to some embodiments of the present invention;

FIG. 13 is a flowchart diagram illustrating a method suitable for managing crop, for example, for the purpose of providing a predetermined yield, according to some embodiments of the present invention FIG. 14 shows cotton fibers yield in units of Kg per dunam of the different fields as a function of a mean plant status;

FIG. 15 shows correlation between cumulative stress and the cotton yield;

FIG. 16 shows almond yield in units of lb per tree of the different trees as a function of cumulative stress;

FIG. 17 shows correlation between cumulative stress and almond yield;

FIGS. 18A and 18B show an image (FIG. 18A) obtained from a geographic information system, and a corresponding canopy size distribution (FIG. 18B); and FIG. 19 shows yield of an entire field in units of lb per acre as a function of the field's cumulative stress.

DESCRIPTION OF SPECIFIC EMBODIMENTS OF THE INVENTION

The present invention, in some embodiments thereof, relates to agriculture and, more particularly, but not exclusively, to a method and system for managing crop treatment.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Some embodiments of the present invention relate to crop management based on a calculated plant status function and/or a calculated plant stress score. The crop management can include execution of one or more operations, such as, but not limited to, scheduled irrigation, fertilization, temperature control, humidity control and the like. It was found by the present inventors that the crop yield can be significantly increased when the value of the plant status function is maintained approximately at or above a predetermined plant status baseline. It was found by the present inventors that the crop yield can be significantly increased when the value of the plant stress score is maintained approximately at or below a predetermined stress baseline.

Thus, in various exemplary embodiments of the invention the crop management operations are selected so as to maintain a value of the plant status function and/or plant stress score and/or some proxy thereof at a predetermined relation (e.g., at or above or below) the plant status baseline or some proxy thereof, for at least a portion of the season (e.g., at least 50% or at least 60% or at least 70% or at least 80% or at least 90% or at least 99% of the season's length). In some embodiment, the plant status function is maintained at or above the plant status baseline at all times. In some embodiment, the plant stress score is maintained at or below the plant stress score baseline at all times. This is optionally and preferably achieved by executing the crop management operation(s) and the calculation of plant status function and/or plant stress score repeatedly, comparing the calculated plant status function and/or plant stress score to the respective baseline, and executing the crop management operation(s) responsively to the comparison. In some embodiments, at least one operational parameter of a crop treatment system is varied when the calculated plant status function is below the plant status baseline, in some embodiments at least one operational parameter of the crop treatment system is varied when a difference between the calculated plant status function and the plant status baseline, in absolute value, is above a predetermined threshold (or within a predetermined range of thresholds), in some embodiments, at least one operational parameter of a crop treatment system is varied when the calculated plant stress score is below the stress score baseline, in some embodiments at least one operational parameter of the crop treatment system is varied when a difference between the calculated plant stress score and the stress score baseline, in absolute value, is above a predetermined threshold.

The thresholds can also by dynamic thresholds. For example, the thresholds can vary over the season or over the year.

Proxies of the plant status function and plant status baseline can include, but are not limited to, any quantity that describe the condition and/or size of the plant itself and is predictable by the plant status function. Representative examples include, without limitation, water potential (e.g., stem water potential), height, fruit diameter, and the like.

The operational parameter the a crop treatment system can be, for example, amount of irrigation, amount of fertilization material, irrigation schedule, fertilization schedule, amount of heat delivered to or extracted from the plant, amount of water content delivered to or extracted from the environment surrounding the plant, and the like. In an embodiment of the invention, when the calculated plant status function is reduced to a level which is below the baseline, the irrigation schedule and amount is varied until the value of the plant status function crosses the baseline.

The baseline can be set, for example, using a lookup table that provides a relation between the plant status baseline and the predicted crop yield or the predicted crop yield improvement for a particular crop. Such lookup table can be prepared in advance for one or more test crop types. For example, a test crop can be grown under controlled conditions so as to ensure a generally fixed level (e.g., within about 20% or within about 10%) of the plant status function during the growth period or during a season of interest. The yield of the test crop can then be measured, and the level of the plant status function can then be defined as the baseline for the measured yield of the test crop. The test crop type, the defined baseline and the measured yield can then be recorded as a single entry of the lookup table. This process can optionally and preferably be repeated for a plurality of fixed levels of the plant status function and/or a plurality of test crop types, thereby providing a lookup table having a plurality of entries. A representative example of a lookup table structure according to some embodiments of the present invention is provided in Table 1, below.

TABLE 1

| Crop type | Predicted Yield | Plant Status Baseline | Stress Score Baseline |
|---|---|---|---|
| A | Y1 | B1 | D1 |
|   | Y2 | B2 | D2 |
|   | Y3 | B3 | D3 |
| B | Y4 | B4 | D4 |
|   | Y5 | B5 | D5 |
|   | Y6 | B6 | D6 |
| C | Y7 | B7 | D7 |
|   | Y8 | B8 | D8 |

In Table 1, A, B and C represent types of crops (for example, without limitation, each of A, B and C can be any of almonds, bell pepper, tomato, melon, water melon, cotton, corn, soya, avocado, mango, citrus, deciduous trees, olives, grapes, and the like). A, B and C are typically different from each other in at least one of genus, species and age. Y1, Y2, . . . Y8 can be yield values (for example, in units of collected crop weight per unit area, or in units of seed generation), B1, B2, . . . B8 are respective plant status baselines (typically, but not necessarily, in dimensionless units normalized to the range [0, 1]), and D1, D2, . . . D8 are respective stress core baselines (typically, but not necessarily, in dimensionless units normalized to the range [0, 1]).

As exemplified in Table 1, each crop type can have more than one predicted yield, wherein each predicted yield is associated with a baseline. Thus, Table 1 provides an example in which there are three yield options for crop A (Y1, Y2, Y3) with three respective status baselines (B1, B2, B3) and three respective stress baselines (D1, D2, D3), three yield options for crop B (Y4, Y5, Y6) with three respective status baselines (B4, B5, B6) and three respective stress baselines (D4, D5, D6), and two yield options for crop C (Y7, Y8) with two respective status baselines (B7, B8) and two respective stress baselines (D7, D8).

The predicted yields for each crop are different from each other and the respective baselines are also different from each other. Predicted yields for different crop types can be the same or different. For example, Y1 can be the same as Y4, Y2 can be the same as Y5, but Y3 can be different from Y6. When two different crop types have the same predicted yield, the respective baseline can be the same or different. For example, when Y1 is the same as Y4, B1 can be different from B4, and when Y2 is the same as Y5, B2 can be the same as B5.

The present embodiments contemplate any number of entries for the lookup table, both in terms of the number of crop types, and in terms of the number of predicted yields and corresponding baselines per each crop type.

The plant status function of the present embodiments can be calculated based on one or more parameters that describe the growth, size variation and/or growth conditions of the plant. Preferably, the plant status function is calculated based on at least two parameters.

The most popular irrigation scheduling techniques to date are based on crop evapotranspiration (ETc) and/or soil water monitoring. It was realized by the present inventors that such techniques have only indirect relation to the well-being of the plant. While irrigation scheduling based on plant-derived measurements has been suggested in the past, such techniques are unpopular due to logistical problems both in obtaining measurements and in interpreting their meaning to irrigation decision making.

It was nevertheless realized by the present inventors that scheduling the irrigation based on plant indicators is particularly useful in cases in which it is desired to avoid water stress at all times for example, to produce large fruit. Such scheduling is also useful in situations in which stress is purposely imposed, for example, as when excessive fruit or vegetative growth produces waste or reduces profit. An additional advantage of such scheduling is that it can be performed automatically.

Trunk diameter variations (TDV) are examined in water relations studies since the 1970s, offering several indicators which may be derived such as trunk growth rate (TGR), the difference between the maximum diameter of two consecutive daily cycles, and maximum daily shrinkage (MDS) which is the difference between daily maximum and minimum values. The sensitivity of TDV to water stress is well-known. However, it was found by the present inventors that aside for water stress TDV also depends the plant's age and size, seasonal growth patterns, crop load and other crop-related factors, so that it is difficult to interpret the output from TDV measurements.

The present inventors have therefore devised a method and a system that repeatedly or continuously records plant behavior that is directly related to the plant status. In various exemplary embodiments of the invention two parameters are monitored. A first parameter describes the shrinkage (e.g., daily shrinkage, for example, maximum daily shrinkage) of a plant part, and a second parameter describes the growth rate (e.g., daily growth rate) of a plant part.

As used herein "plant part" refers to any part of a plant, such as, but not limited to, a trunk, a stem, a fruit and a leaf of the plant.

Typically, but not necessarily, both the first parameter and the second parameter characterize the behavior (shrinkage, growth rate) of the same plant part. For example, when the first parameter describes the daily shrinkage of the trunk, the second parameter also describes the daily growth rate of the trunk. In various exemplary embodiments of the invention both parameters are calculated using data generated by the same sensing element, as further detailed hereinunder.

In some embodiments the plant part is the trunk of the plant, in some embodiments the plant part is the stem of the plant, and in some embodiments the plant part is the fruit of the plant.

Figure 1:
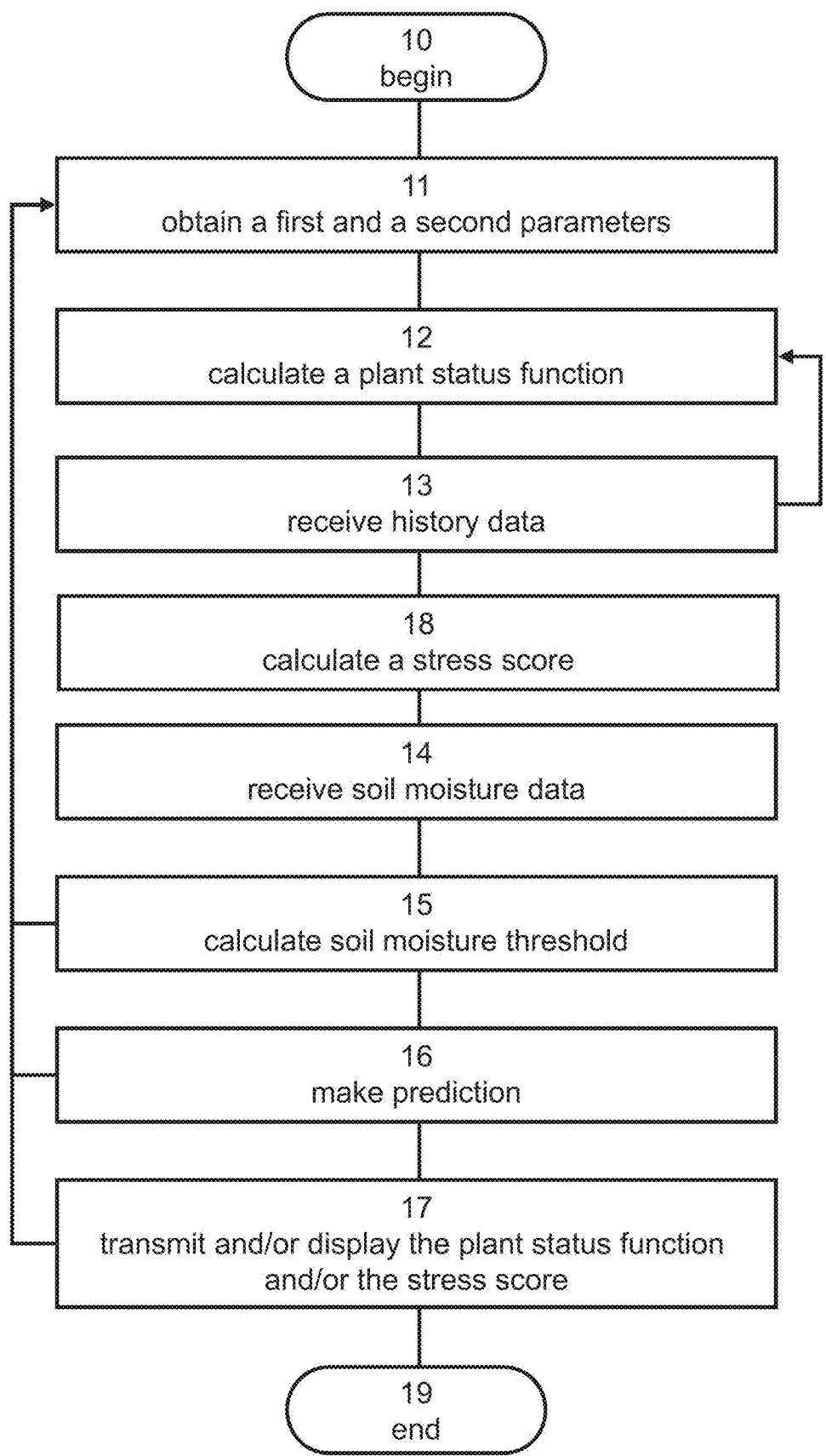

Referring now to the drawings, FIG. 1 is a flowchart diagram illustrating a method suitable for characterizing a status of a plant, according to some embodiments of the present invention.

The method of the present embodiments can be embodied in many forms. For example, selected operations of the method can be embodied in on a tangible medium such as a computer for performing the operations. Selected operations of the method can be embodied on a non-volatile computer readable medium, comprising computer readable instructions for carrying out the operations. Selected operations of the method can also be embodied in electronic device having digital computer capabilities arranged to run the computer program on the tangible medium or execute the instruction on a non-volatile computer readable medium.

Computer programs implementing the method according to some embodiments of this invention can commonly be distributed to users on a distribution medium such as, but not limited to, CD-ROM, flash memory devices, flash drives, or, in some embodiments, drives accessible by means of network communication, over the internet (e.g., within a cloud environment), or over a cellular network. From the distribution medium, the computer programs can be copied to a hard disk or a similar intermediate storage medium. The computer programs can be run by loading the computer instructions either from their distribution medium or their intermediate storage medium into the execution memory of the computer, configuring the computer to act in accordance with the method of this invention. Computer programs implementing the method according to some embodiments of this invention can also be executed by one or more data processors that belong to a cloud computing environment. All these operations are well-known to those skilled in the art of computer systems. Data used and/or provided by the method of the present embodiments can be transmitted by means of network communication, over the internet, over a cellular network or over any type of network, suitable for data transmission.

It is to be understood that, unless otherwise defined, the operations described hereinbelow can be executed either contemporaneously or sequentially in many combinations or orders of execution. Specifically, the ordering of the flowchart diagrams of this application is not to be considered as limiting. For example, two or more operations, appearing in the following description or in the flowchart diagrams in a particular order, can be executed in a different order (e.g., a reverse order) or substantially contemporaneously. Additionally, several operations described below are optional and may not be executed.

The method begins at 10 and continues to 11 at which the method obtains a first parameter describing shrinkage (e.g., a daily shrinkage, for example, maximum daily shrinkage) of a part of the plant, and a second parameter describing a growth rate (e.g., a daily growth rate) of a part of the plant. The method continues to 12 at which the method calculates, for example, by operating a data processor, a plant status function based on a value of the parameters.

In some embodiments of the present invention the method proceeds to optional 13 at which the method receives history data pertaining to a status of the crop, and then loops back to 12 for updating the plant status function based in part on the history data. The history data can include previously calculated values of the plant status function, previously obtained parameters describing shrinkage and/or growth rate (for example, first and second parameters as obtained during previous executions of the method), and the like. Thus, the present embodiments contemplate a machine learning procedure, wherein the plant status function is calculated based on newly acquired data as well as previously acquired data.

It was found by the present inventors that a plant stress score that is calculated based on previously obtained values of the plant status function correlates to the crop yield. Thus, in some embodiments of the present invention the method proceeds to optional 18 at which a plant stress score is calculated based on the plant status function and on history values of the plant status function. The plant stress score can be calculated by combining values of the plant status function obtained over some time period. For example, plant status function values obtained daily over a period as defined above can be combined. Typically, the plant stress score decreases when the combination of the plant status function values increases. For example, the calculation of the plant stress score can comprise calculating an additive inverse of such a combination. A representative example of a plant stress score, which is not to be considered as limiting, is provided below.

In some embodiments of the present invention the method proceeds to optional 14 at which the method receives soil moisture data from a soil in which the crop is planted, and to 15 at which a soil moisture threshold is calculated for the soil moisture data based on the plant status function. The soil moisture data can be received from any soil moisture sensor known in the art that measures the soil water status (either water potential or water content). Representative examples including, without limitation, such as, but not limited to, Frequency Domain Reflectometry (FDR) sensor, Tensiometer, and Time Domain Reflectometers (TDR).

It was realized by the present inventors that it is difficult to define a threshold value for such measurements, due to the diversity of soil physical properties of different soils types, due to the uneven distribution of the soil water, and due to the different responses of different plants or the same plant under different environmental conditions to the change in soil moisture. While conceiving the present invention it has been hypothesized and while reducing the present invention to practice it has been realized by the present inventors that the plant status function can be used for calibrating soil moisture data, since the plant status function expresses the behavior of the plant, which behavior is effected inter alia by the soil moisture. Thus, the plant status function of the present embodiments can be used for determining whether a particular level or range of levels of soil moisture is sufficient for the plant to provide a sufficient yield. Preferably, the calibration is updated when a new value of the plant status function is calculated. In some embodiments of the present invention the method calculates a threshold for soil moisture data based on the plant status function.

In some embodiments of the present invention the plant status function is used for determining whether a particular climate condition (e.g., temperature, humidity, radiation) is sufficient for the plant to provide a sufficient yield. For example, when the plant status function is sufficiently high (e.g., above a predetermined threshold) for some observed climate condition, the method can determine that the observed climate condition is sufficient for the plant to provide a sufficient yield.

It was found by the present inventors that the plant status function of the present embodiments correlates well to many observables pertaining to the quality of the plant in a future time. These observables include, but are not limited to, plant height, fruit size (weight and/or diameter), fruit maturity time and yield. The present inventors that the plant status function of the present embodiments correlates well to the water potential (WP) of the plant part (e.g., the step water potential or the trunk water potential). Thus, according to some embodiments of the present invention the method continues to 16 at which the method predicts, based on the plant status function of the present embodiments, an estimate of at least one of the plant height, the fruit size (weight and/or diameter), the fruit maturity time, the yield and the water potential of the plant part. These embodiments are useful for providing reference guidelines for crop management and control. The prediction can be based on a comparison between the calculated plant status function and the aforementioned baseline, for example, using a lookup table as further detailed hereinabove.

The method optionally and preferably continues to 17 at which the calculated plant status function and optionally the soil moisture threshold and/or the aforementioned predicted estimates and/or the plant stress score is/are transmitted to a computer-readable medium, such as a non-volatile computer-readable medium, to a display device, or to a remote location. In some embodiments of the present invention the method issues an alert when a predetermined criterion or set of criteria are met. For example, the method issues an alert when the value of plant status function is below a predetermined threshold, or when the soil moisture is below the calculated soil moisture threshold. In some embodiments of the present invention the method generates a transmittable alert and transmits it to a remote location, for example, over the internet or a cellular network. In some embodiments, the alert is sent one or more cellular telephones and generates a sensible signal (such as a displayed message, a displayed indicia, a displayed graphics, an audio signal and/or a vibration of the device).

In some embodiments of the present invention the method loops back to 11 from 15 and/or 16 and or 17 so as to repeatedly obtain the parameters, recalculate the plant status function and optionally recalculate the soil moisture threshold.

The method ends at 19.

The first parameter and second parameter can be obtained in more than one way. In some embodiments, the method receives the parameters as input from an external source, such as, but not limited to, a remote computer. In some embodiments, the method receives the parameters via a user interface which is associated with the data processor. Alternatively, the method can extract the parameters from data accessible to the method. For example, the method can access a database containing previously recorded measurements of one or more physical quantities, or receive measurements directly or indirectly from sensors deployed in the field, near or on the plant itself.

The present embodiments contemplate many types of data from which the first and second parameters can be extracted or calculated. Representative examples including, without limitation, dendrometer data, water potential data, water content data, electrical conductivity data, temperature data and any combination of these types of data. The data can be collected by one or more sensors located near or on any of the aforementioned parts of the plant. Representative examples of data types and associated plant parts include, without limitation, dendrometer data measured by a dendrometer mounted on the stem the trunk of the fruit; water potential data measured by pressure chamber or Psychrometer located at or near the stem or the leaf, water content measured by a water content sensor located at or near the stem or the trunk, electrical conductivity measured by an electrical sensor (e.g., ohm meter) mounted on the stem or the trunk, and temperature data measured by a temperature measuring device located at or near the leaf.

Additional data types that can be received or acquired by the method according to some embodiments of the present invention including, without limitation, water content is in the soil, crop temperature measured on or at the stem of the leaf, air temperature measured in the air, and soil temperature measured in the soil. Further contemplated are data pertaining to the humidity and/or radiation condition at the site of the crop.

Preferably, but not necessarily, the plant part for which the plant status function is calculated by the method is the same as the plant part at which the measurements of the data are performed. For example, when the first and second parameters are extracted from dendrometer data measured at the trunk of the plant, the plant status function is calculated for the trunk. Also contemplated are embodiments in which the data are collected from one part and the plant status function is calculated for a different part, by means of correlation. For example, when there is a correlation between the behavior of the stem and the behavior of the trunk, the first and second parameters can be extracted from dendrometer data measured at the trunk of the plant, and the plant status function can calculated for the stem.

The measurements of the quantity that corresponds to the respective data type are optionally and preferably performed to obtain a time-dependence of the quantity over a sufficiently long time period. Ideally, the measurement of the quantity is continuous resulting in a continuous set of values of the quantity over a continuous time interval. However, such continuous set of values is rarely attainable, and in practice, although the measurement can be continuous, a plurality of values of the quantity is obtained at a plurality of discrete time instances. The number of obtained samples is nevertheless sufficient for obtaining (e.g., by interpolation) the time-dependence of the quantity over the time period. Thus, a sequence of samples of the quantity is generated at various time-instances separated from each other by sufficiently short time-intervals. The obtained time-dependence is a mathematical function which expresses the value of the quantity as a function of time, for at least a few instances within the time period. In some embodiments of the present invention the mathematical function is a continuous function expressing the value of the quantity as a function of time, for any time t within the time period.

The time-period over which the measurements are obtained is optionally and preferably sufficiently long so as to allow monitoring variations in the value of the measured quantity across two or more days. The intervals between consecutive time instances at which measurements are obtained (e.g., repeated) are optionally and preferably sufficiently short to allow monitoring variations in the value of the measured quantity across different periods of the day. Typically, but not obligatorily, the measurements are obtained at least every 6 hours or at least every 4 hours or at least every 2 hours or at least every 1 hour or at least every 30 minutes or at least every 15 minutes, over a period of at least 5 days or at least 10 days or at least 20 days or at least 30 days or at least 2 months or at least 4 months or at least 6 months or at least 8 months or at least 10 months or at least a year or at least a time period which is equivalent to a season.

The plant status function of the present embodiments is optionally and preferably specific for the crop under analysis. In some embodiments of the present invention the plant status function is specific to the genus of the crop, in some embodiments of the present invention the plant status function is specific to the species of the crop, in some embodiments of the present invention the plant status function is specific to the age of the crop, and in some embodiments of the present invention the plant status function is specific to the stage within the growth cycle of the crop (e.g., vegetative stage, reproductive stage, pre-flowering stage, onset of flowering stage, flowering stage, fructification stage, etc).

The specificity of the plant status function is ensured by the type of analysis that is applied to the data.

As used herein, "type of analysis" refers to at least one of the technique used for extracting the parameters from the data, and the dependence of the plant status function on the parameters once extracted.

A plant status function which is specific to the genus of the crop can be obtained when the analysis that is applied to the data is the same for all the species within the genus. In these embodiments, the method selects an analysis procedure based only on the genus of the crop, irrespectively of its species. A plant status function which is specific to the species of the crop can be obtained when the analysis that is applied to the data is the different for different species among the same genus. In these embodiments, the method selects an analysis procedure based both on the genus of the crop and on its species.

When the plant status function is specific to the age and/or stage within the growth cycle of the crop, it is optionally and preferably also specific to the genius and/or species. For example, the method can select an analysis procedure based on the genus of the crop, its species and its age; or based on the genus of the crop and its age irrespectively of the species; or based on the genus of the crop, its species and its stage within the growth cycle; or based on the genus of the crop and its stage within the growth cycle irrespectively of the species; or based on the genus of the crop, its species, its age and its stage within the growth cycle; or any other combination.

Generally, the plant status function of the present embodiments is expressed as a combination of the first and second parameters. A representative example of a such combination is a combination of a first function $g(p_1)$ of the first parameter $p_1$ and a second function $h(p_2)$ of the second parameter $p_2$. In some embodiments of the present invention a linear combination of g and h is employed. This can be mathematically formulated as:

$$S = \alpha g(p_1) + \beta h(p_2) \quad \text{(EQ. 1)}$$

where $\alpha$ and $\beta$ are coefficients which are optionally and preferably calculated by fitting the function S to the measured data. Any of $\alpha$ and $\beta$ can depend on each or both of the parameters $p_1$ and $p_2$.

The value of each parameter is typically, but not necessarily, representative of data collected during a single day. For example, $p_1$ can be the maximal shrinkage of the plan part during the respective day, and $p_2$ can be the growth rate during the respective day. The growth rate can be calculated as the difference between representative diameters of the plant part on the respective day and the preceding day, wherein the representative diameters can be any of the maximal diameters, average diameters, median diameters, minimal diameters and the like.

In some embodiments of the present invention each of $\alpha$ and $\beta$ is expressed as ratio between a variation of the respective parameter and a sum of variations of both parameters. This can be mathematically formulated as:

$$\alpha = \Delta p_1 / (\Delta p_1 + \Delta p_2)$$

$$\beta = \Delta p_2 / (\Delta p_1 + \Delta p_2) \quad \text{(EQ. 2)}$$

In some embodiments of the present invention the variations $\Delta p_1$ and $\Delta p_2$ are calculated with respect to a value of the respective parameter on a preceding day.

Typically, but not necessarily, the first derivatives of g and h have opposite signs, so that one function increases with the respective parameter while the other function decreases with the respective parameter. It was found by the present inventors that it is advantageous to select a $g(p_1)$ as a decreasing function of the first parameter and $h(p_2)$ as an increasing function of the second parameter. But embodiments in which $g(p_1)$ is an increasing function of the first parameter and $h(p_2)$ is a decreasing function of the second parameter are also contemplated.

In some embodiments of the present invention the method normalizes the parameters, wherein the plant status function S is expressed as a function of the normalized parameters. A typical normalization factor is the difference between the maximal and the minimal values of the respective parameters. Such normalization procedure can be expressed as:

$$p_1 \to p_1/n_1$$

$$p_2 \to p_2/n_2 \quad \text{(EQ. 3)}$$

where $n_1 = (p_{1,max} - p_{1,min})$ is the normalization factor of $p_1$, $n_2 = (p_{2,max} - p_{2,min})$ is the normalization factor of $p_2$; $p_{1,max}$ and $p_{1,min}$ are the maximal and minimal values of $p_1$, respectively; and $p_{2,max}$ and $p_{2,min}$ are the maximal and minimal values of $p_2$, respectively. The minimal and maximal values are typically calculated based on data collected over a period of several (e.g., 5-20) days. In some embodiments of the present invention one of the minimal and maximal values for each parameter is predetermined and fixed, while the other one of the minimal and maximal values is extracted from the data. Also contemplated are embodiments in which both the minimal and maximal values of at least one parameter are predetermined and fixed. Further contemplated are embodiments in which both the minimal and maximal values of at least one parameter are extracted from the data received from the plant part.

Optionally and preferably, at least one (e.g., both) the functions g and h is a linear function of the respective parameter. An expression for the plane status function, in a specific embodiment of the invention is:

$$S = \alpha(p_{1,max} - p_1)/n_1 + \beta(p_2 - p_{2,min})/n_2, \quad \text{(EQ. 4)}$$

where $\alpha$ and $\beta$ are optionally and preferably calculated according to EQ. 2. Each of the two terms of the right-hand side of EQ. 4 typically returns a non-negative value which is lower than 1. The returned value of S is typically from 0 to 1.

Several values of the plane status function, for example, as obtained from EQ. 4 above, can be used for calculating the plant stress score. For example, values obtained daily can be combined and the combination can be used for calculating the score. In some embodiment the values are combined by summation. It was found by the present Inventor that when a summation is employed the score expresses an accumulated stress of the plant. Preferably, the stress score is calculated by combining only plant status function values that are below a predetermined threshold, while excluding other values from the combination. An expression for the plane stress score C, in a specific embodiment of the invention is:

$$C = \sum_{i=1}^{n} -(S_i - \sigma), \forall S_i < \sigma \quad \text{(EQ. 5)}$$

where $S_i$ is the value of the plant status function obtained for the ith day, $\sigma$ is the predetermined threshold, and n is the number of days for which the plane stress score is calculated. For example, n can be the number of days during which measurements of the first and second parameters were obtained. The value of the threshold $\sigma$ is preferably within the range of the values of S. Typically, but not necessarily, $\sigma$ is about half the maximal value of S. Since C is calculated using several status functions, C can also have a daily value which can be calculated based on the status functions that were calculated until a particular day. Thus, for example, the stress score $C_k$ of the kth day can be calculated based on the status functions $S_1, \ldots S_k$.

In some embodiment the stress score is defined as the absolute value of the result obtained using EQ. 5, namely by making the transformation C→|C|.

The function $S_i$ and the threshold σ are typically dimensionless. In these embodiments, C can be expressed in units of time (e.g., days).

The present Inventors found that the plant status function, and optionally also the plant stress score can be estimated also for plants or plant parts for which the daily shrinkage and daily growth rates are unknown. This is optionally and preferably performed based on geographic data pertaining to the field containing the crop. Such geographic data can be obtained, for example, from a geographic information system (GIS).

A GIS can provide a GIS image of the field, which image that may include various data structures, each of which may be regarded as a layer of the image. These layers provide information regarding various GIS parameters. Exemplary GIS parameters may include, for example, canopy area (e.g., canopy area distribution), temperature (e.g., temperature distribution), normalized difference vegetation index (NDVI) (e.g., NDVI distribution), total area of a land (the field plus adjacent areas), historical weather and climate data, soil attributes (e.g., soil types, texture, organic matter, fertility test results, etc.), the presence and location of ground and surface water, and any man-made features upon the land (e.g., buildings, roads, ditches, etc.) currently existing or formerly in existence, location, size, and shape of the field, tiling information, historical crop and outcome data, and the like. The geographical data can be used by the method to extrapolate the values of the plant status function and/or plant stress score also to regions that are remote from the plant at which the parameters were monitored.

For example, when two spaced apart plants are at regions that are similar with respect to the geographical data that describe these regions, the method can determine that the plant status function and/or plant stress score of these regions are the same. As a representative example, consider a situation in which the geographic data comprises canopy size distribution. Consider further that the first and second parameters have been monitored for a plant having a canopy size X1 and that the plant status function at a particular day was calculated to be S1. According to some embodiments of the present invention the method search over the GIS image for other regions at which the canopies have the same size X1, and estimate, for that particular day, the plant status function to be S1.

As another example, consider that the first and second parameters have been monitored for a first plant having a canopy size X1 and also for a second plant having a canopy size X2>X1, and that that the plant status functions at a particular day was S1 for the first plant and S2 for the second plant. Consider a situation that the method search over the GIS image and finds a third plant whose canopy size is X3 where X1<X3<X2. According to some embodiments of the present invention the method can find an interpolation in the range of values [S1, S2] over the plant status function space and use the interpolation to estimate the plant status function that corresponds to canopy size X3.

Generally, based on known GIS parameters (e.g., canopy sizes) and corresponding plant status function values, the method can aculeate a functional dependence S(X) of the plant status function on the GIS parameter, and use the functional dependence to estimate the plant status function for a plant whose canopy size is known from the GIS image.

Alternatively or additionally, based on known GIS parameters (e.g., canopy sizes) and corresponding plant stress scores, the method can aculeate a functional dependence C(X) of the plant stress score on the canopy size and use the functional dependence to estimate the plant stress score for a plant whose canopy size is known from the GIS image.

The GIS parameters can also be used for calculating a field status function or a field stress score, by combining the values of the status functions and/or stress scores obtain obtained for the individual plants in the field, based on the distribution of one or more GIS parameters over the field. For example, the range of values of a GIS parameter over the field can be divided into bins, and the plants of the field can be classified according to the bins. The relative weight of each bin can be defined as the percentage of plants that are classified as belonging to that bin, and a weighted average of the status functions or stress scores of the individual plants can be calculated using the relative weight of the bins as the weights of the average. The weighted average of the status functions can be defined as the field status function, and the weighted average of the stress scores can be defined as the field stress score.

The system can output the field status function and/or field stress score as further detailed hereinabove.

Figure 2:
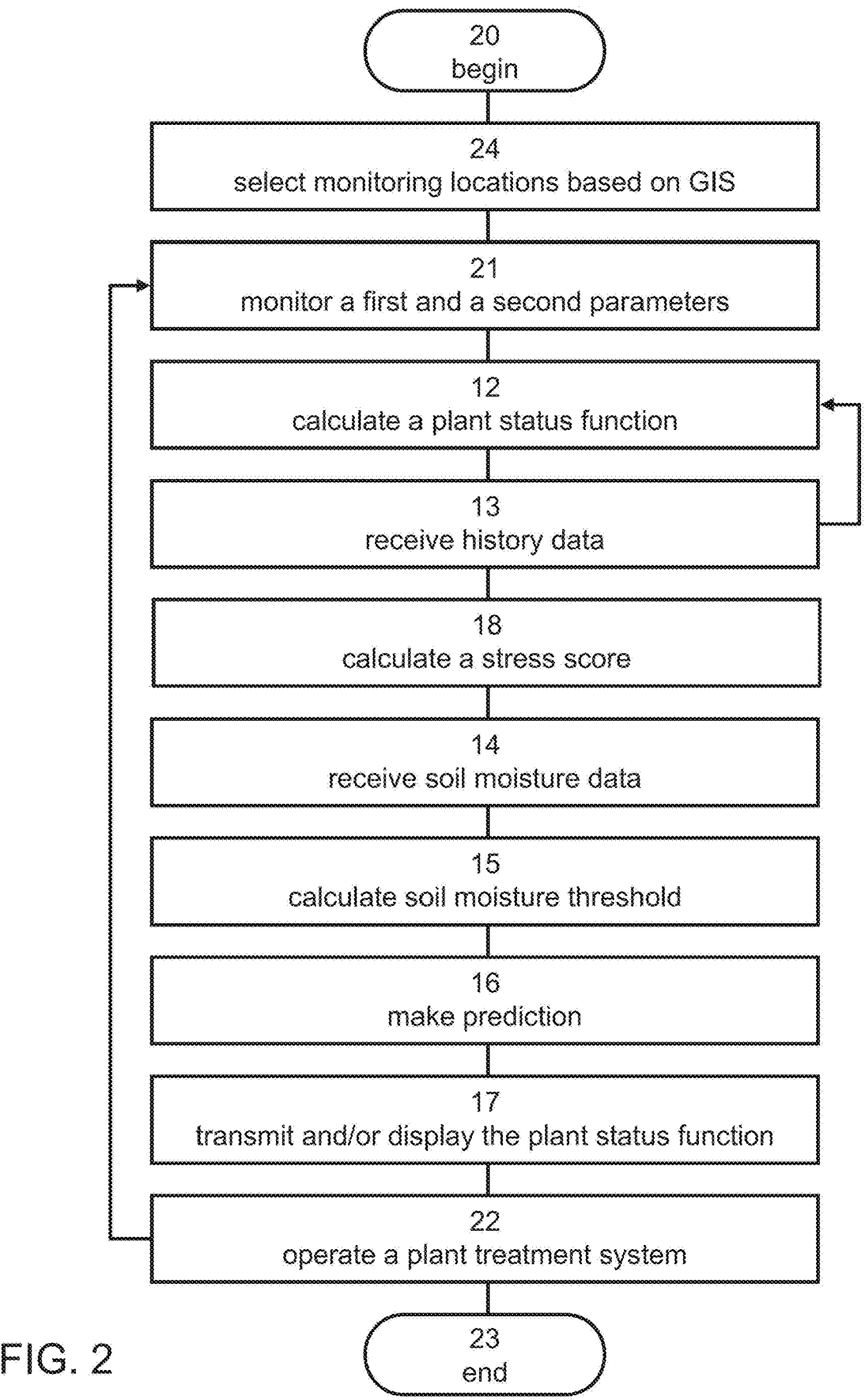

FIG. 2 is a flowchart diagram illustrating a method suitable for managing treatment of crop, according to some embodiments of the present invention. The method optionally and preferably implements the plant status function as described above for the purpose of managing the treatment, e.g., the irrigation of the crop.

The method begins at 20 and continues to 21 at which the method monitors a first parameter describing shrinkage (e.g., a daily shrinkage, for example, maximum daily shrinkage) of a part of the plant, and a second parameter describing a growth rate (e.g., a daily growth rate) of a part of the plant, as further detailed hereinabove. In some embodiments, the locations over the field of the plant parts for which the first and second parameters are monitored are selected 24 based on the information obtained from the GIS. For example, when the range of values of a GIS parameter over the field is divided into bins, two or more of the selected locations are optionally and preferably classified into different bins, so as to allow the calculation of functional dependence as further detailed hereinabove. As a representative example, when the data comprises canopy size distribution, two or more of the selected locations are optionally and preferably characterized by different canopy sizes.

The method continues to 12 at which the method calculates a plant status function as further detailed hereinabove. In some embodiments of the present invention the method proceeds to optional 13 at which the method receives history data pertaining to a status of the crop, and then loops back to 12 for updating the plant status function based in part on the history data, as further detailed hereinabove. In some embodiments method proceeds to optional 18 at which the method calculates a stress score as further detailed hereinabove.

In some embodiments of the present invention the method proceeds to optional 14 at which the method receives soil moisture data, and to 15 at which a soil moisture threshold is calculated. According to some embodiments of the present invention the method continues to 16 at which the method predicts an estimate at least one of the water potential of the plant part or the height of plant. The prediction can be based on a comparison between the calculated plant status function and the aforementioned baseline, for example, using a lookup table as further detailed hereinabove.

The method optionally and preferably continues to 17 at which the calculated plant status function and optionally the soil moisture threshold and/or the aforementioned predicted estimates is/are transmitted to a computer-readable medium, such as a non-volatile computer-readable or to a display device.

Once the plant status function and/or plant stress score is/are obtained, the method proceeds to 22 at which the method operates a crop treatment system responsively to the plant status function and/or plant stress score. The crop treatment system can be, for example, a controllable irrigation system, in which case the amount and/or schedule of the irrigation can be set based on the plant status function.

Representative examples of uses of the plant status function and/or plant stress score for setting the amount and/or schedule of the irrigation are provided in the Examples section that follows. When the method receives soil moisture data, the method optionally calibrates the soil moisture data based on the plant status function, and the irrigation system is operated responsively to the calibrated data. For example, the method can compare the soil moisture data to the calculated threshold, wherein the irrigation system is operated responsively to the comparison. Specifically, when the soil moisture is above the threshold the irrigation is decreased or ceased, and when the soil moisture is below the threshold the irrigation is increased or initiated.

Another crop treatment system that is contemplated by some embodiments of the present invention include, without limitation, a controllable fertilization system.

Some embodiments contemplate an automatic process, in which the method calculates the plant status function and automatically operates the crop treatment system based on the calculated plant status function.

In some embodiments of the present invention the method loops back to 11 from 22 so as to repeatedly monitor the parameters, recalculate the plant status function and operate the treatment system.

The method ends at 23.

FIG. 13 is a flowchart diagram illustrating a method suitable for managing crop, for example, for the purpose of providing a predetermined yield, according to some embodiments of the present invention.

The method begins at 130 and continues to 131 at which at least one parameter describing growth and/or condition of the plant is monitored as further detailed hereinabove. The method continues to 132 at which a plant status function is calculated based on a value of the monitored parameter(s). The plant status function can, in some embodiments of the present invention, be the value of the monitored parameter. These embodiments are useful when a single parameter is monitored, but may also be useful when more than one parameter is monitored. In the latter case, one parameter can be selected and the value of the plant status function can be defined as the value of the selected parameter. Also contemplated, are embodiments in which several parameters are monitored, and several plant status functions are defined, wherein at least one plant status function is defined as the value of one of the monitored parameters.

The method continues to 133 at which the calculated plant status function or a proxy thereof is compared to a plant status baseline or a proxy thereof. The plant status baseline is preferably predetermined and corresponds to a yield value or yield improvement value, as further detailed hereinabove. For example, the plant status baseline can be one of the plant status baselines of a lookup table, similar to Table 1, above.

The method optionally continues to 137 at which a plant stress score is calculated based on several values of the plant status function, as further detailed hereinabove. The method can continue from 137 to 138 at which the calculated score or a proxy thereof is compared to a stress score baseline D or a proxy thereof. The stress baseline is preferably predetermined and corresponds to a yield value or yield improvement value, as further detailed hereinabove. For example, the stress baseline can be one of the stress baselines of a lookup table, similar to Table 1, above.

The method optionally and preferably continues to 134 at which a crop treatment system is operated responsively to the comparison 133 and/or the comparison 138. In some embodiments, the plant status function is maintained below the baseline, in some embodiments, the plant status function is maintained above the baseline, in some embodiments, the plant stress score is maintained below the baseline and in some embodiments, the plant stress score is maintained above the baseline.

Optionally, the method moves from 133 to decision 135 at which the method determines whether the difference between the plant status function and the baseline, in absolute value, is above a predetermined threshold. Decision 135 can be executed independently of the execution of 134. If the difference is above the threshold, the method preferably continues to 136 at which an alert is issued.

Optionally, the method moves from 138 to decision 139 at which the method determines whether the difference between the stress score and the baseline, in absolute value, is above a predetermined threshold. Decision 139 can be executed independently of the execution of 134. If the difference is above the threshold, the method preferably continues to 140 at which an alert is issued.

In some embodiments of the present invention the method generates a transmittable alert and transmits it to a remote location, for example, over the internet or a cellular network. In some embodiments, the alert is sent to one or more cellular telephones and generates a sensible signal (such as a displayed message, a displayed indicia, a displayed graphics, an audio signal and/or a vibration of the device).

The method ends at 141.

Figure 3:
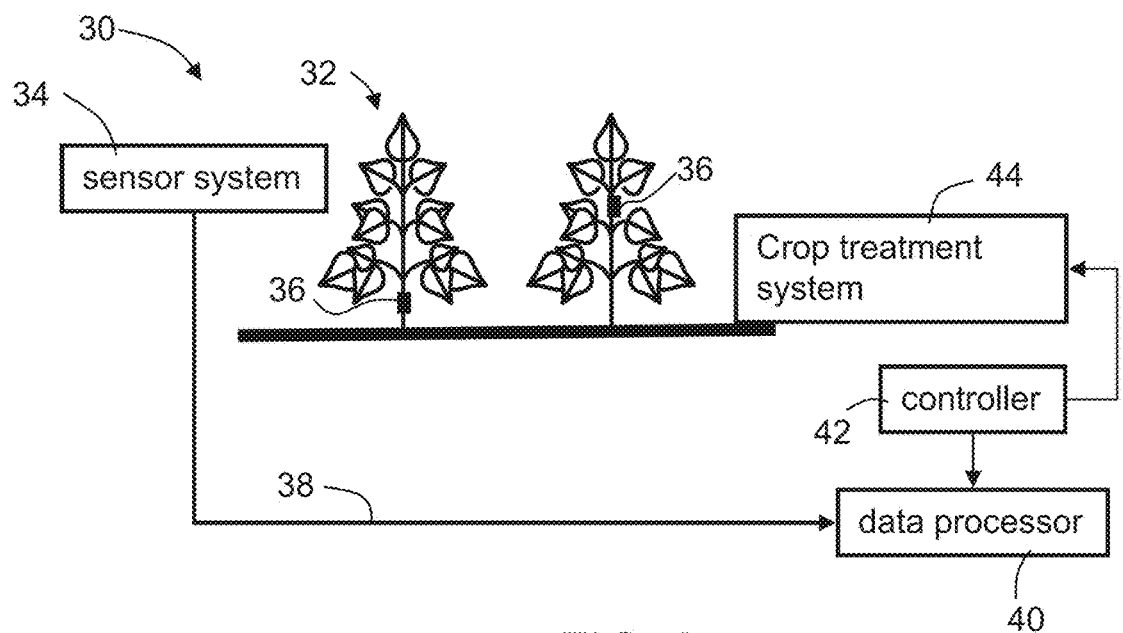

FIG. 3 is a schematic illustration showing a block diagram of a system 30 for managing treatment of crop 32, according to some embodiments of the present invention. System 30 comprises a sensor system deployed and configured for measuring and transmitting data pertaining to a first parameter describing a daily shrinkage of a plant part of crop 32, and a second parameter describing daily growth rate of a plant part of crop 32. The parameters are optionally and preferably the same or similar to the parameters described above with respect to method 10 or method 20. Sensor system is designated by block 34, but represents also embodiments in which the sensor system includes a plurality of sensing elements arranged for measuring the parameters for each of at least a portion of the plants of crop 32. Representative examples of such sensing elements are shown at 36. The sensing elements can be attached to the plant part, as illustrated in FIG. 3, or it can be position near the plant part. In various exemplary embodiments of the invention the sensor system comprises at least one dendrometer.

A dendrometer is a known device, which typically comprises a transducer member which is capable of mechanically flexing in response to changes in plant stem or trunk size. The transducer member can include strain gauges, such as, but not limited to, electronic strain gauges, attached thereto in a configuration which allows flexing of the transducer member to be measured as the level of strain in the attached strain gauges vary.

A dendrometer useful for the present embodiment can optionally include elongated jaws connected to the transducer member for engaging the plant part. The jaws are preferably designed to cause minimum destruction and deformation of the plant stem tissue. The dendrometer can, for example, use single C-shaped, plastic or other noncorrodible and temperature staple transducer members. The dendrometer can alternatively include arms which can be hinged together and connected by a transducer member which experiences strain as a result of size changes of stems engaged between the hinged arms or elongated jaws attached or integral therewith. Further alternative forms of the dendrometer can utilize a pair of hinged plates which contact the plant stem or trunk. In these embodiments the transducer member extends between the pair of hinged plates and experiences measurable strain due to changes in the stem or trunk size. Other types of dendrometers are also contemplated in some embodiments of the present invention. Other types of sensors are also contemplated. Representative examples including, without limitation, a pressure chamber, a psychrometer and/or a temperature sensor.

It is expected that during the life of a patent maturing from this application many relevant sensing elements will be developed and the scope of the term sensing elements is intended to include all such new technologies a priori.

Sensor system 34 can transmit the measured data over a communication channel 38 which can be a wired communication channel or a wireless communication channel as desired.

System 30 also comprises a data processor 40 which is configured to receive the data from the sensor system, extract the parameters and calculate a plant status function based on a value of the parameters. In some embodiments, data processor 40 also calculates a stress score as further detailed hereinabove. In various exemplary embodiments of the invention data processor executes at least some of the operations described above with respect to method 10 and/or method 20 and/or method 130. Optionally, system 30 also comprises a controller 42 which communicates with data processor 40 and is configured for operating a crop treatment system 44 responsively to the calculated plant status function and/or plant stress score as further detailed hereinabove. In some embodiments of the present invention system 30 also comprises the crop treatment system 44.

As used herein the term "about" refers to ±10%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Example 1

Correlation of the Plant Status Function to SWP

Materials and Methods

An experiment was held during 2013 season in a commercial almonds tree orchard. All trees were of the same species, age and growth stage. The trees were 20 years old and grown at similar conditions (a well drained clay loam soil). Variations in trunk diameters were recorded every 1 hour by means of two dendrometers (DE (dendrometer) Dendrometer Phytomonitor Stations, PhyTech Ltd., Yad Mordechai, Israel) placed on two different trees.

SWP was measured in the same trees instrumented with dendrometers with pressure chamber (Model 3005; Soil Moisture Equipment, Santa Barbara, Calif.).

The first parameter $p_1$ was the maximum daily shrinkage, denoted M in this example, and the second parameter $p_2$ was the trunk growth rate, denoted G in this example. The plant status function was calculated daily by means of EQs. 2 and 4, in accordance with some embodiments of the present invention. The plant status function was calculated for each tree separately. The normalizations factors were $n_1=M_{max}-M_{min}$ and $n_1=G_{max}-G_{min}$, where $M_{max}$, $M_{min}$, $G_{max}$, $G_{min}$, were the minimum and maximum values of M and G over a period of 10 days. The two calculated plant status functions (one for each tree) are denoted S1 and S2.

In addition, management operations were selected so as to maintain a value of the plant status function of the present embodiments at a predetermined plant status baseline, thereby achieving, with a probability of more than 0.8, a predetermined SWP value. Correlation between SWP and yield is known [Shackel, K. A., S. Gurusinghe, and D. K. W. Micke. 1998. Water stress responses of almond [*Prunus dulcis* (Mill.) Webb] trees under field conditions. Acta Hort. 470:309-316]. The method of the present embodiments has been implemented for almonds crop as follows. Crop management operations were executed and the plant status function was calculated repeatedly. The calculated plant status function was compared to the baseline, and the crop management operations were executed responsively to the comparison. In the present example, the irrigation schedule was updated during season to fit the baseline, resulting in better correlation to SWP and leading to improved yield.

Results

Figure 4:
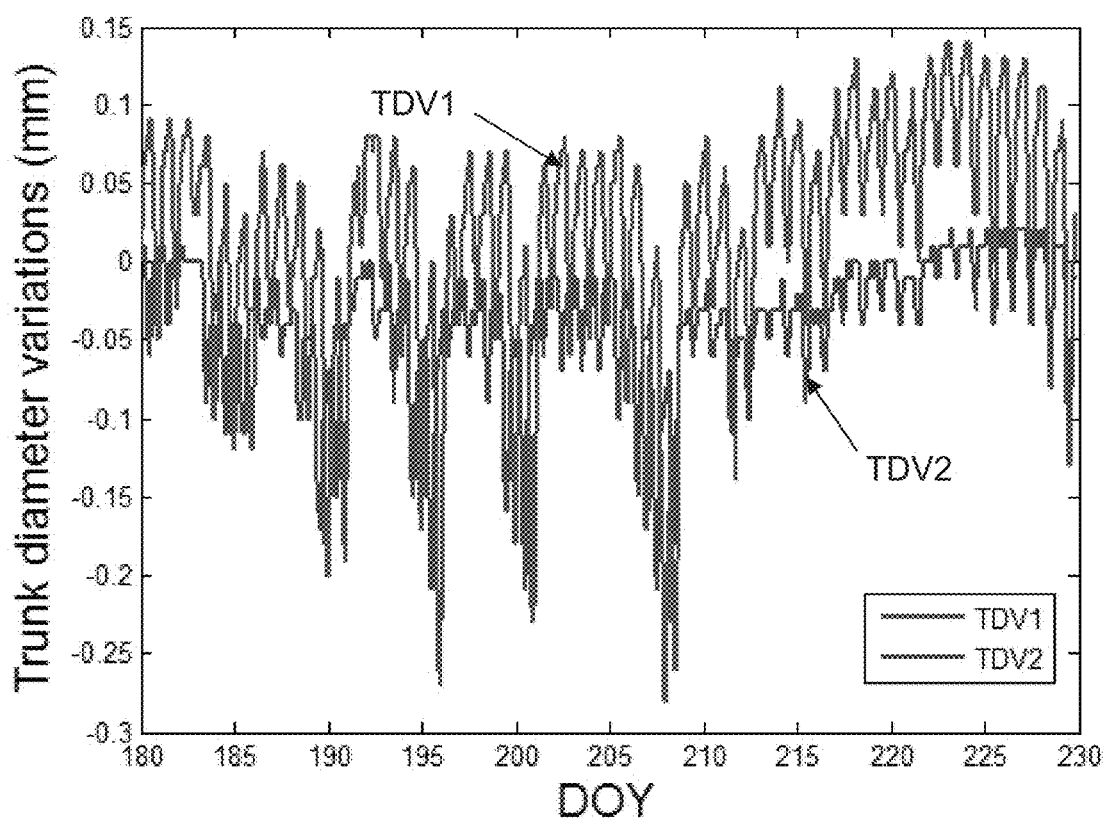

FIG. 4 shows trunk diameter variations in millimeters of the two trees as a function of the day of the year (DOY). As shown, the net growth of the trees at this age and in that period of the year is negligible. On the other hand, the trunk diameter changes rapidly, showing significant daily contraction and swelling. MDS values are changing with the irrigations (every 4-5 days) and therefore MDS can be examined as an indicator for plant water status.

Figure 5:
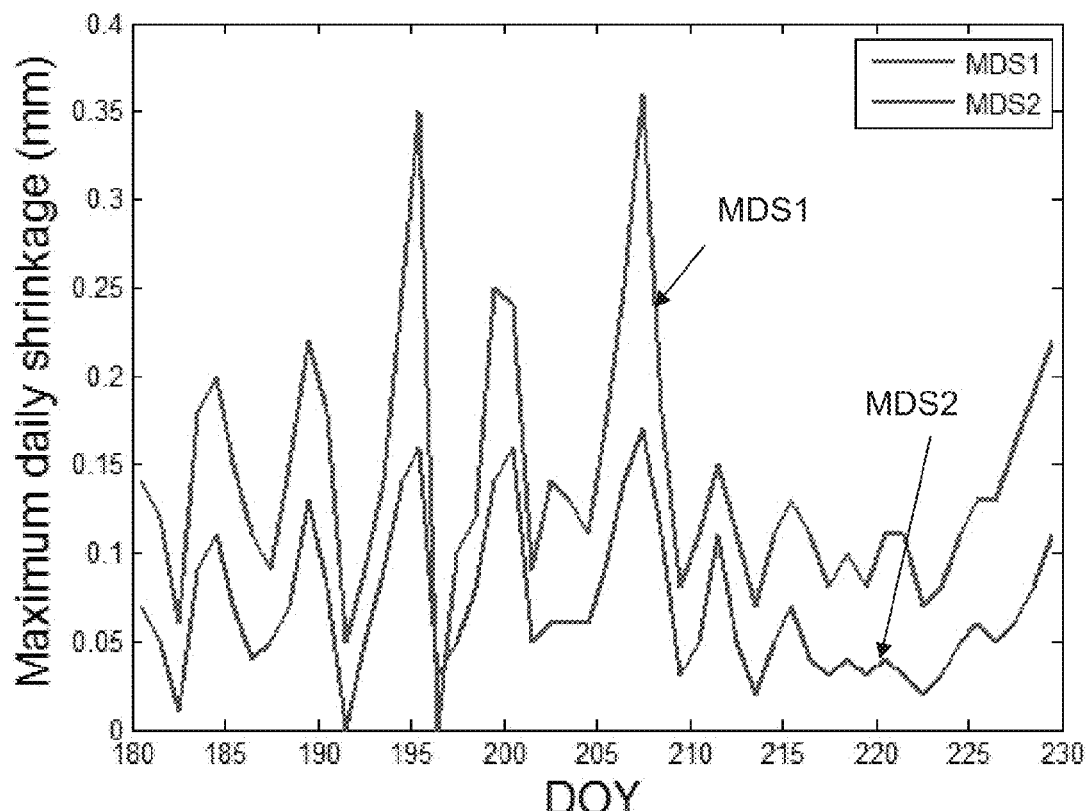

FIG. 5 shows MDS values of the two trees, as calculated from the trunk diameter changes. As shown there are significant differences in MDS values between the two trees. Therefore, it is difficult to set irrigation according to a specific value of MDS, since MDS as a single parameter varies among trees of the same species, age and growth stage.

Figure 6:
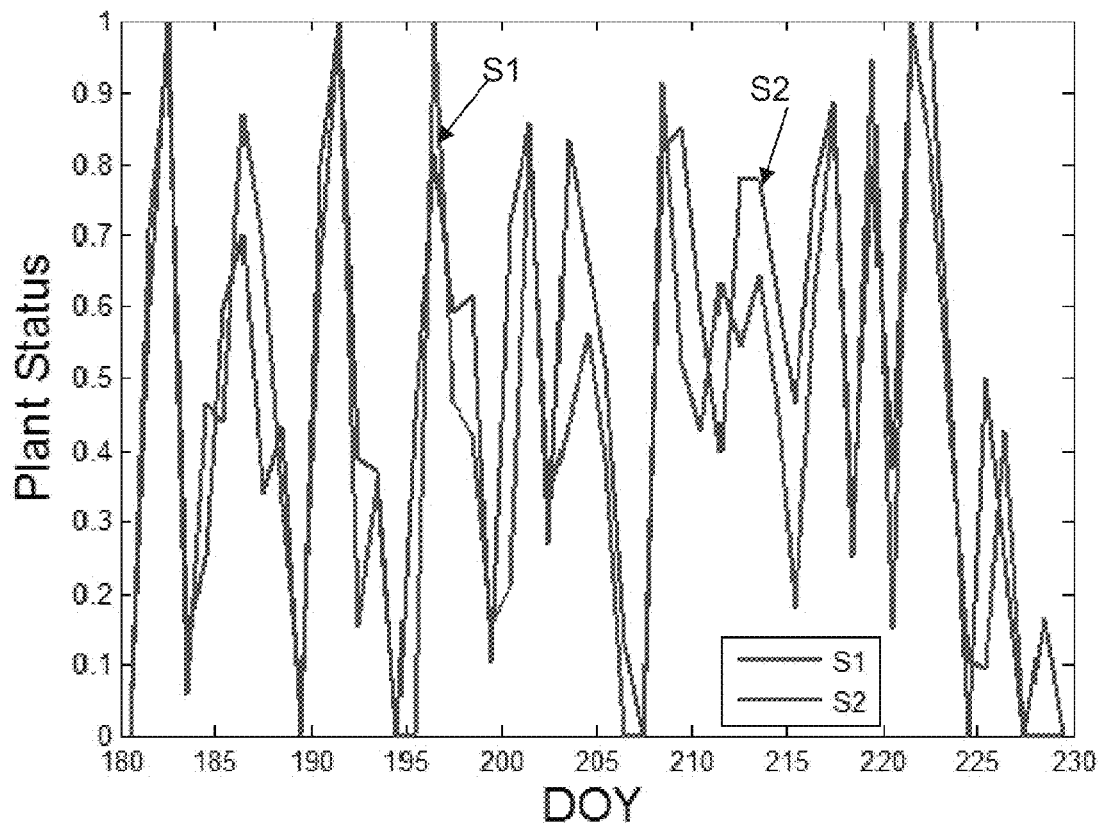

FIG. 6 shows the plant status functions S1 and S2, as calculated for each tree according to some embodiments of the present invention. As shown, the values of S1 and S2 are consistent for both trees.

Figure 7:
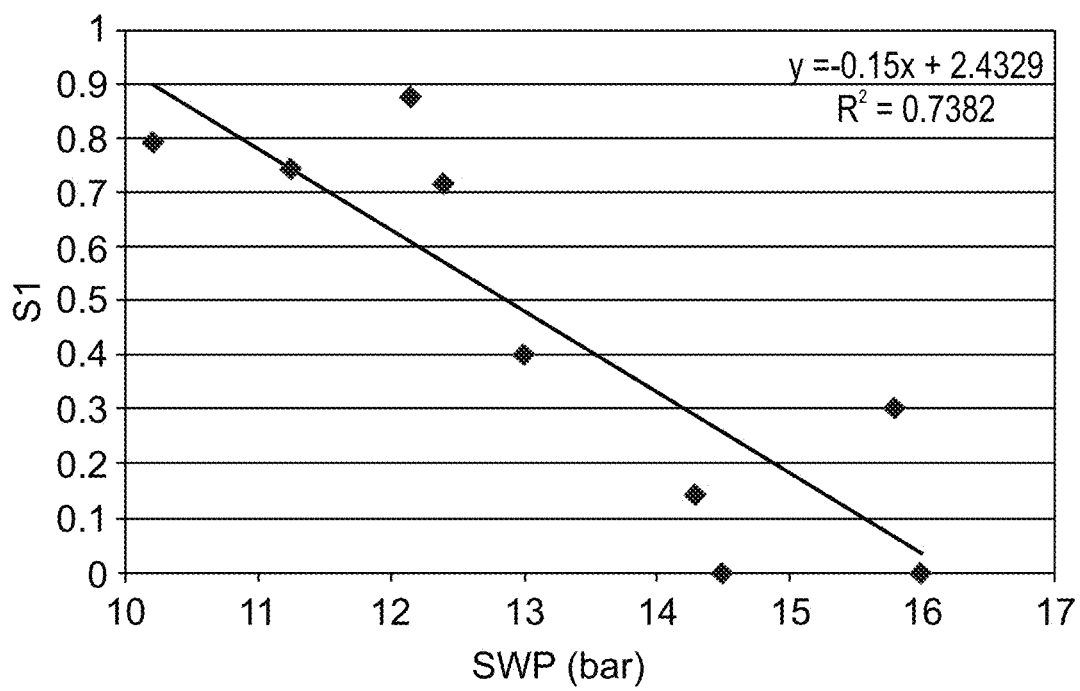

FIG. 7 shows the correlation between the plant status function of the present embodiments and the measured SWP. The corresponding coefficient of determination $R^2$ is 0.7382, indicating that the plant status function correlates well with SWP and can therefore be used instead of SWP as an plant indicator.

Figure 11:
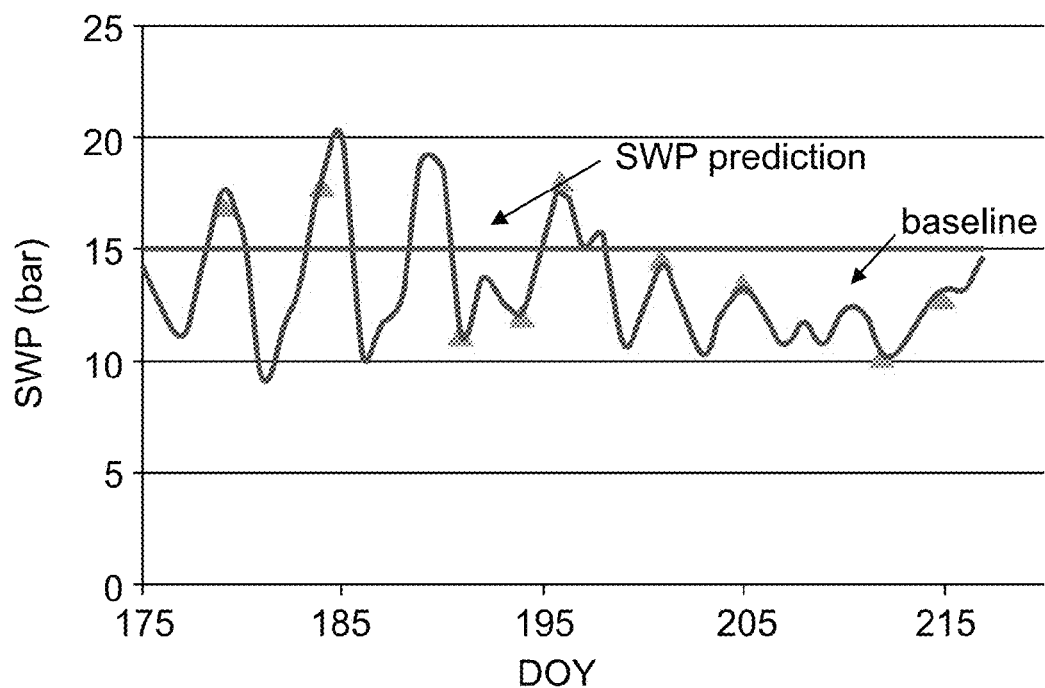

FIG. 11 shows SWP prediction based on plant status, measured SWP values (triangles) and a reference baseline. The irrigation schedule was selected so as to maintain the predicted SWP at or below the baseline. As shown, the crop management operation (irrigation schedule, in the present example) maintains the predicted SWP below the baseline, following DOY 200. The low SWP ensured improved yield.

Example 2

Correlation of the Plant Status Function to SWP and Plant Height

It was found by the present inventors that the plant status function of the present embodiments also correlates well to other plant indicators in other crops, including, without limitation, bell pepper, tomato, melon, water melon, cotton, corn, soya, avocado, mango, citrus, deciduous trees, olives and grapes. Thus, the plant status function of the present embodiments can be used to prevent or reduce plant stress in order to achieve better yields. In the present example, the plant status function was calculated for cotton.

In cotton, the main plant indicators which are used to evaluate the plant stress are the plant height during the vegetative stage and SWP during the reproductive stage. This example demonstrates that these two indicators correlate well to the plant status function of the present embodiments. This correlation can be used to predict the plant height and/or SWP using the plant status function of the present embodiments. It is appreciated that such prediction can provide reference guidelines for enhancing crop management and control.

Materials and Methods

An experiment was held during 2013 season in a commercial cotton fields. Variations in 100 stem diameters were recorded every 1 hour by means of stem diameter sensor (SD (Stem Diameter) Stem Diameter Phytomonitor Stations, PhyTech Ltd., Yad Mordechai, Israel).

The first parameter $p_1$ was the maximum daily shrinkage, denoted M in this example, and the second parameter $p_2$ was the trunk growth rate, denoted G in this example. The plant status function was calculated daily by means of EQs. 2 and 4, in accordance with some embodiments of the present invention. The normalizations factors were $n_1=M_{max}-M_{min}$ and $n_1=G_{max}-G_{min}$, where $M_{max}$, $M_{min}$, $G_{max}$, $G_{min}$, were the minimum and maximum values of M and G over a period of 10 days.

SWP and plant height were measured in the same field. Plant height and SWP were also calculated using the plant status function of the present embodiments.

Cotton plant height is known as an indicator for successful yield. The ability to predict the plant height based on the plant status function of the present embodiments allows defining a plant status baseline. Management operations were selected so as to maintain a value of the plant status function at a predefined baseline, thereby achieving a predefined plant height. In the present example, crop management operations and plant status function calculations were executed repeatedly. The calculated plant status function was compared to the baseline, and the crop management operations were executed responsively to the comparison. Improved height and timing were achieved, leading to a significant increment in yield (+15%).

Results

Figure 8:
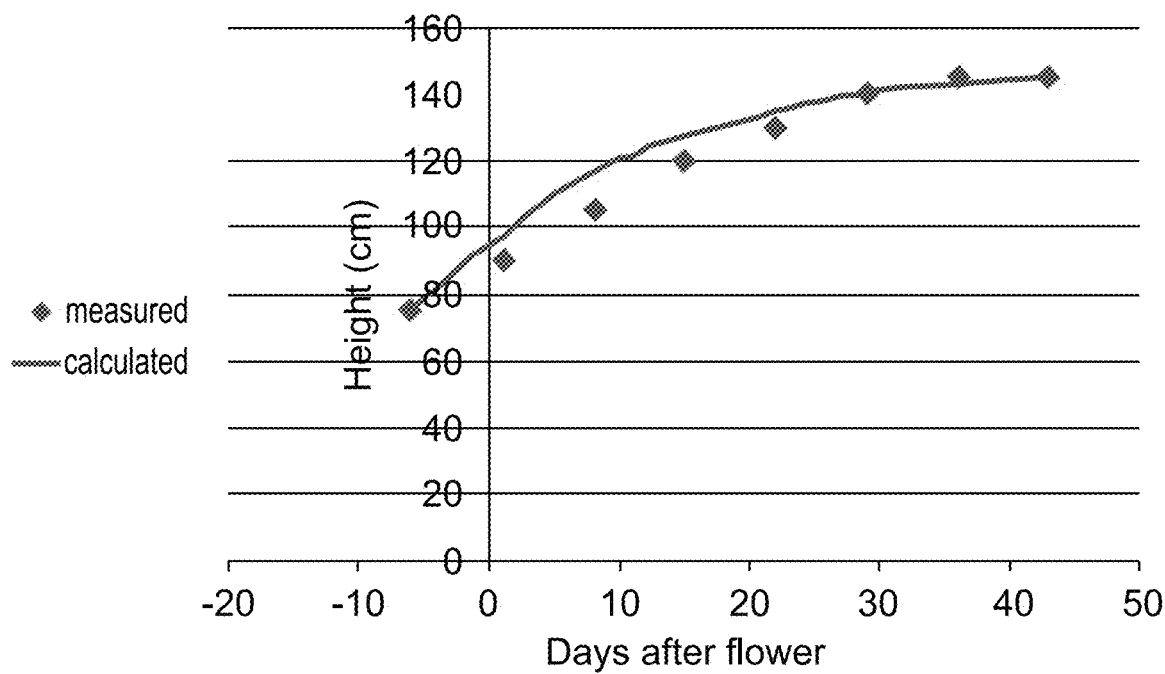
Figure 9:
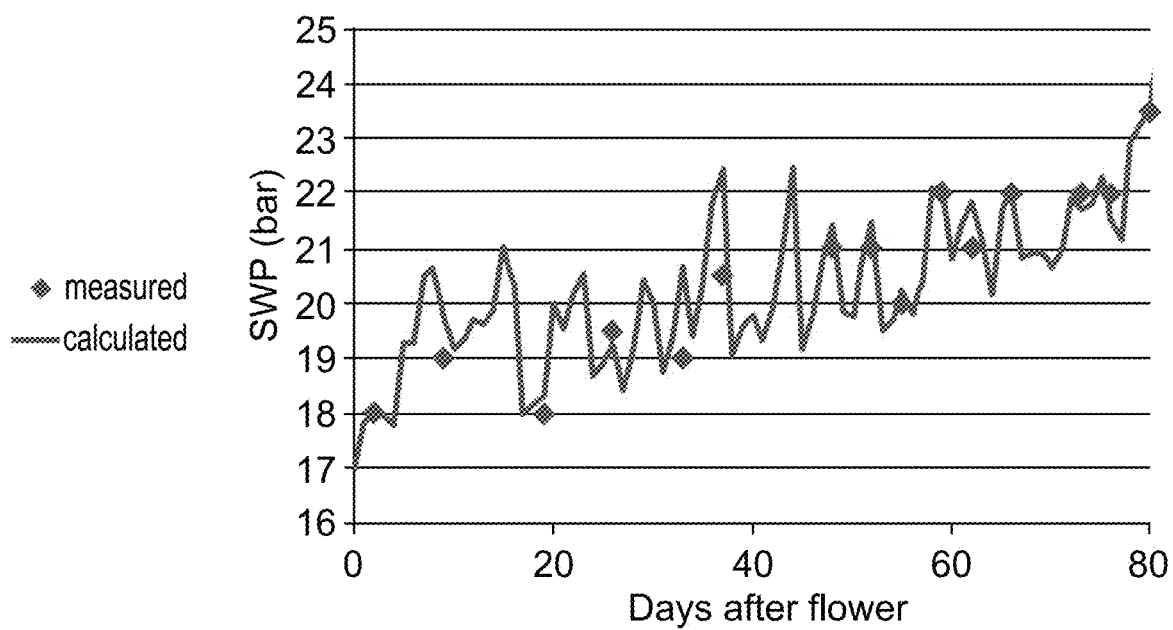

FIGS. 8 and 9 show the cotton height (FIG. 8) and SWP (FIG. 9) for a representative plant as measured (diamonds) and as calculated using the plant status function of the present embodiments (solid line). As shown, both the height and the SWP agree well with the values as predicted by the plant status function of the present embodiments.

FIG. 12 shows cotton height prediction based on plant status, cotton height measurements (diamonds), and two reference baselines (denoted baseline1 and baseline2) as defined based on the height prediction. These reference baselines can be converted to plant status baselines for crop management practice, leading to improved yield as explained above.

Example 3

Use of the Plant Status Function for Defining Soil Moisture Threshold

This Example demonstrates that the plant status function is useful for defining threshold for soil moisture or irrigation.

Materials and Methods

An experiment was held during 2013 season in a commercial bell pepper greenhouse. The bell peppers were planted at DOY 220 in a well drained sandy soil. Variations in trunk diameters were recorded every 1 hour by means of stem diameter sensors (SD (Stem Diameter) Stem Diameter Phytomonitor Stations, PhyTech Ltd., Yad Mordechai, Israel). Soil water content was measured with FDR.

The first parameter $p_1$ was the maximum daily shrinkage, denoted M in this example, and the second parameter $p_2$ was the trunk growth rate, denoted G in this example. The plant status function was calculated daily by means of EQs. 2 and 4, in accordance with some embodiments of the present invention. The normalizations factors were $n_1 = M_{max} - M_{min}$ and $n_1 = G_{max} - G_{min}$, where $M_{max}$, $M_{min}$, $G_{max}$, $G_{min}$, were the minimum and maximum values of M and G over a period of 7 days.

Results

Figure 10:
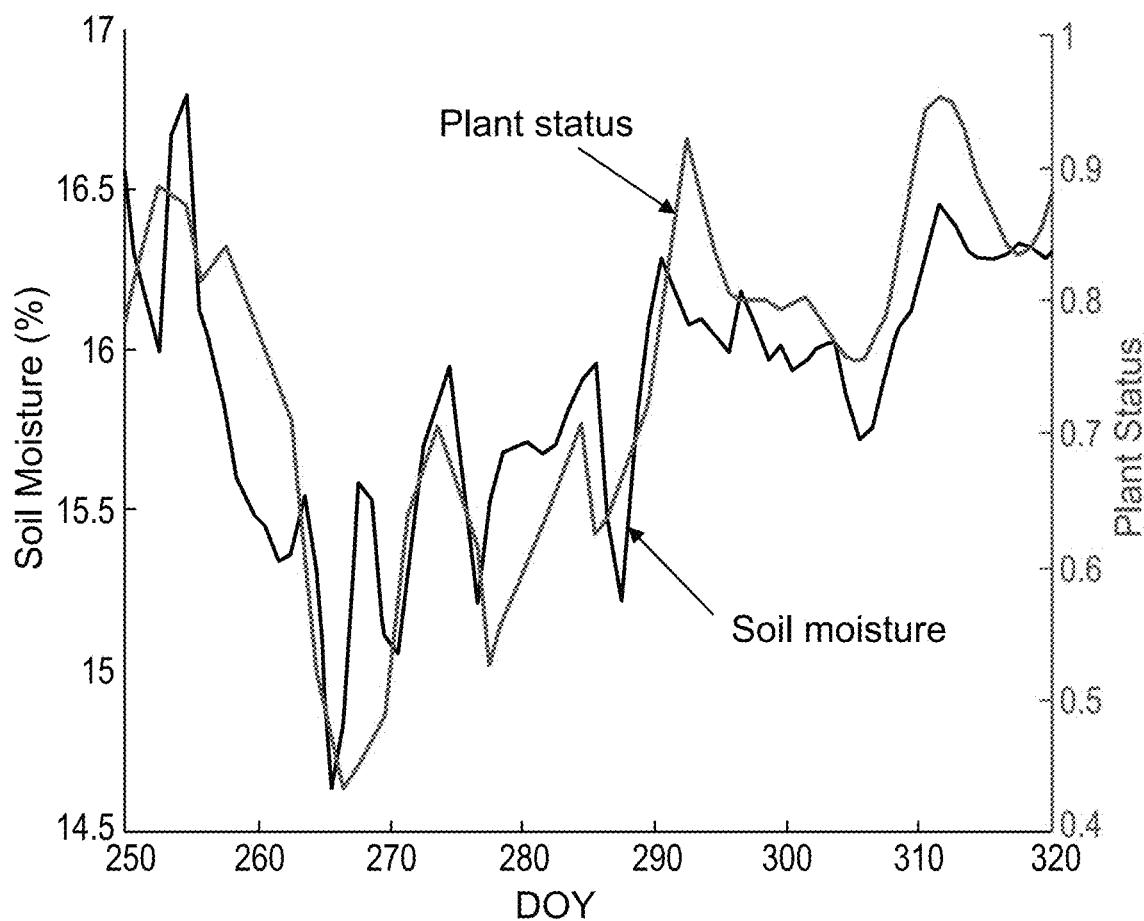

FIG. 10 shows the soil moisture in percentage (left ordinate) and the plant status function (right ordinate). As shown, from DOY 260 to DOY 290 the plant status function significantly reduced (below 0.7). This indicates that the plant is in stress. In this period, the water content also decreased. A threshold for minimum water content of 15.75 has been therefore defined from DOY 290. Keeping the soil moisture above this level by proper operation of the irrigation system allowed keeping the plant away from the stress condition.

Example 4

Use of Plant Stress Score for Predicting Yield

Cotton 24 cotton fields in Israel over one growing season were monitored. For each field the stem diameter of a representative plant was monitored continuously with a dendrometer. The daily plant status function and its moving average were calculated. Based on the plant status function, a plant stress score was calculated according to EQ. 5 above, using a threshold σ that was set to 0.47. In this example, the plant stress score is referred to as a cumulative stress. The cotton fibers yield of each field was weighed.

FIG. 14 shows Cotton fibers Yield in units of Kg per dunam of the different fields as a function of the mean Plant Status. Also shown are the correlation coefficient, the root mean square error (RMSE) and standard deviation (STDV). Comparing the RMSE with the STDV it is observed that the mean plant status has reduced the error by half.

FIG. 15 and Table 2 below show the correlation between the cumulative stress (C.S) and the yield. As shown, the cumulative stress has a negative effect on the final yield, wherein higher cumulative stress provides a lower yield.

Almonds 17 almond trees in California, USA were monitored over one growing season. Each tree was equipped with a dendrometer and monitored continuously. The daily plant status and its moving average were calculated for each tree. The cumulative stress was calculated according to EQ. 5 above, using a threshold σ that was set to 0.4.

Due to technical problems, data for three tree dendrometers was partial. The results and analysis are presented below for the trees with sufficient amount data.

FIG. 16 shows Almond Yield in units of lb per tree of the different trees as a function of cumulative stress. Also shown are the correlation coefficient, the root mean square error (RMSE) and standard deviation (STDV). Comparing the RMSE with the STDV it is observed that the mean plant status has reduced the error by more than half.

FIG. 17 and Table 2 below show the correlation between the cumulative stress (C.S) and the yield. Because of insufficient number of samples the almond trees were grouped into two groups according to cumulative stress ranges. As shown, the cumulative stress has a negative effect on the final yield, wherein higher cumulative stress provides a lower yield.

The cumulative stress was found to be in good correlation with the yield, in particular during the first part of the growing season, until late May. This maybe because the growing values of MDS in the late, reproductive stage are not necessarily related to water stress.

TABLE 2

| Cotton | $P_{AB} = 0.00029$, $P_{BC} = 0.04147$, $P_{AC} = 0.00004$, |
| --- | --- |
| Almonds | $P_{AB} = 0.00497$ |

In Table 2, $P_{xy}$ is the P value for the student's t-test between group x and group y. This is a two-sided test for the null hypothesis that two independent samples have identical average (expected) values. In this example no assumption that the two groups had equal population variance was made. Such student's t-test is sometimes referred to as Welch's t-test. Presented in Table 2 is the Welch's test for cotton and almonds, between each two groups of cumulative stress ranges. The P values <0.05 mean a strong presumption against the null hypothesis that there are no significant differences between the means of each couple of groups.

Example 5

Use of Geographic Data for Estimating Plant Stress Score

Almond trees in three fields in California, USA were monitored over one growing season. In each field, measurements were taken at three different locations, two different trees on each location. For each individual tree, a plant stress score was calculated according to EQ. 5 above, using a threshold σ that was set to 0.4. In this example, the plant stress score is referred to as a cumulative stress. The correlation between the cumulative stress of each individual tree and the yield of that individual tree was calculated.

For each field the canopy size distribution was obtained from a GIS image. The cumulative stress of the field was calculated as a weighted average of the calculated cumulative stress over the entire field using the canopy size distribution as a weighting function. Specifically, in the averaging procedure, the cumulative stress of each tree was weighted according to the percentage of the trees having the same or similar (e.g., within 20%) canopy size. The correlation between the cumulative stress of the field and the yield of the field was calculated.

FIGS. 18A and 18B show an image (FIG. 18A) as from a GIS, and a corresponding canopy size distribution (FIG. 18B), and FIG. 19 shows the yield of the entire field in units of lb per acre as a function of the field's cumulative stress. As shown, by combing geographic data with the cumulative stress calculated for several individual trees, a cumulative stress that characterizes the entire field and that is highly correlated to the yield of the field can be obtained.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of managing treatment of crop, comprising:
   monitoring a first parameter which comprises a maximal daily shrinkage of a plant part of the crop, and a second parameter describing daily growth rate of a plant part of the crop;
   calculating a plant status function based on a value of said first parameter and a value of said second parameter; and
   operating a crop treatment system responsively to said plant status function.

2. The method according to claim 1, wherein said plant status function is a linear function of said first and said second parameters.

3. The method of claim 2, wherein for at least one of said parameters, a coefficient of said parameter within said linear function is proportional to a variation of said parameter.

4. The method of claim 2, wherein for at least one of said parameters, a coefficient of said parameter within said linear function is a ratio between a variation of said parameter and a sum of variations of said first and said second parameter.

5. The method according to claim 1, wherein said calculating said plant status function comprises normalizing said first and said second parameters using values extracted from data received from said plant part, wherein said plant status function is a function of said normalized parameters.

6. The method according to claim 1, further comprising calculating a plant stress score based on said plant status function and on history values of said plant status function.

7. The method according to claim 6, further comprising predicting an estimate of at least one of a height of said plant, a fruit size of said plant, a fruit maturity time of said plant, a yield of said plant, and a water potential of said plant part based on said plant stress score.

8. The method according to claim 1, further comprising comparing said calculated plant status function to a plant status baseline, wherein said operating said crop treatment system is responsively to said comparison.

9. The method of according to claim 1, wherein said plant status function is specific to a genus of the crop.

10. The method according to claim 1, wherein said plant status function is specific to a species of the crop.

11. The method according to claim 1, wherein said plant status function is specific to an age of the crop.

12. The method according to claim 1, wherein said plant status function is specific to a stage in a growth cycle of the crop.

13. The method according to claim 1, further comprising receiving history data pertaining to a status of the crop, and updating said plant status function based in part on said history data.

14. The method according to claim 1, further comprising receiving soil moisture data from a soil in which the crop is planted, and calibrating soil moisture data based on said plant status function.

15. The method according to claim 14, wherein said calibration comprises calculating soil moisture threshold, and the method comprises monitoring said soil moisture data and repeatedly comparing said monitored soil moisture data to said soil moisture threshold, wherein said operating said crop treatment system is responsively to said comparison.

16. The method according to claim 1, further comprising receiving irrigation amount data, and calibrating said irrigation amount data based on said plant status function.

17. The method according to claim 1, further comprising predicting an estimate of at least one of a height of said plant, a fruit size of said plant, a fruit maturity time of said plant, a yield of said plant, and a water potential of said plant part based on said plant status function.

18. The method according to claim 1, wherein said plant part is selected from the group consisting of a trunk, a stem and a fruit.

19. The method according to claim 1, wherein said monitoring said first and said second parameters comprises receiving dendrometer data from said plant part and calculating said parameters based on said dendrometer data.

20. The method according to claim 1, further comprising receiving from a geographic information system geographic data pertaining to a field containing the crop, and providing, based on said geographic data and said plant status function of said plant part, an estimated plant status value corresponding to a plant part for which said daily shrinkage and said daily growth rates are unknown.

21. The method according to claim 1, further comprising receiving from a geographic information system geographic data pertaining to a field containing the crop, selecting, based on said geographic data, a plurality of plant parts at different locations over said field, and repeating said monitoring, and said calculation of said plant status function for each selected plant parts.

22. The method according to claim 21, further comprising providing, based on said geographic data and said calculated plant status function, an estimated plant status value corresponding to a plant part for which said daily shrinkage and said daily growth rates are unknown.

23. A method of characterizing a status of a plant, the method comprising:
   receiving over a communication network a first parameter which comprises a maximal daily shrinkage of a part of the plant, and a second parameter describing daily growth rate of a part of the plant, and storing said parameters in a computer readable memory;
   operating a data processor for calculating a plant status function based on a value of said first parameter and a value of said second parameter, for transmitting said plant status function to a non-transitory computer readable medium or a display device; and transmit a signal to one or more cellular telephones to issue an alert when the value of plant status function is below a predetermined threshold.

24. A computer software product, comprising a non-transitory computer-readable medium in which program instructions are stored, which instructions, when read by a data processor, cause the data processor to execute the method of claim 23.

25. A system for managing treatment of crop, comprising:
- a sensor system deployed and configured for measuring and transmitting over a communication network data pertaining to a first parameter which comprises a maximal daily shrinkage of a plant part of the crop, and a second parameter describing daily growth rate of a plant part of the crop; and
- a data processor configured for receiving said data from said sensor system, storing said data in a computer readable memory, extracting said parameters from said data, calculating a plant status function based on a value of said parameters, and for transmitting a signal to one or more cellular telephones to issue an alert when the value of plant status function is below a predetermined threshold.

* * * * *